(12) United States Patent
Fukushima et al.

(10) Patent No.: US 10,123,023 B1
(45) Date of Patent: Nov. 6, 2018

(54) MOVING PICTURE CODING DEVICE AND MOVING PICTURE CODING METHOD

(71) Applicant: JVC KENWOOD Corporation, Yokohama-shi (JP)

(72) Inventors: Shigeru Fukushima, Yokosuka (JP); Hideki Takehara, Yokosuka (JP); Motoharu Ueda, Yokosuka (JP)

(73) Assignee: JVC KENWOOD Corporation, Tokyo (JP)

( * ) Notice: Subject to any disclaimer, the term of this patent is extended or adjusted under 35 U.S.C. 154(b) by 0 days.

(21) Appl. No.: 16/035,913

(22) Filed: Jul. 16, 2018

Related U.S. Application Data

(63) Continuation of application No. 14/477,778, filed on Sep. 4, 2014, now Pat. No. 10,063,860, which is a
(Continued)

(30) Foreign Application Priority Data

Mar. 23, 2012 (JP) .................. 2012-067663
Mar. 23, 2012 (JP) .................. 2012-067664

(51) Int. Cl.
*H04N 11/04* (2006.01)
*H04N 19/159* (2014.01)
(Continued)

(52) U.S. Cl.
CPC ......... *H04N 19/159* (2014.11); *H04N 19/109* (2014.11); *H04N 19/136* (2014.11);
(Continued)

(58) Field of Classification Search
None
See application file for complete search history.

(56) References Cited

U.S. PATENT DOCUMENTS

2013/0195188 A1* 8/2013 Sugio .............. H04N 19/00721
375/240.14

FOREIGN PATENT DOCUMENTS

JP          10276439 A     10/1998
WO       2013/111596 A1    8/2013

OTHER PUBLICATIONS

Ikai, "Bi-prediction restriction in small PU," Joint Collaborative Team on Video Coding (JCT-VC) of ITU-T SG16 WP3 and ISO/IEC JTC1/SC29/WG11, 7th meeting: Geneva, CH, Nov. 21-30, 2011.
(Continued)

*Primary Examiner* — Dakshesh D Parikh
(74) *Attorney, Agent, or Firm* — Brundidge & Stanger, P.C.

(57) ABSTRACT

In a moving picture coding device that codes a moving picture using motion compensation prediction in units of blocks acquired by dividing each picture of the moving picture, a prediction mode determiner derives motion information of a coding target block. A motion compensation predictor changes the derived motion information for the coding target block having a size smaller than or equal to a certain size when the coding target block has the size smaller than or equal to the certain size. The motion compensation predictor constructs a prediction signal of the coding target block through the motion compensation prediction using the derived motion information when the coding target block has a size larger than the certain size or using the changed motion information when the coding target block has the size smaller than or equal to the certain size.

2 Claims, 33 Drawing Sheets

Related U.S. Application Data continuation of application No. PCT/JP2013/001929, filed on Mar. 21, 2013.

(51) Int. Cl.

| | | |
|---|---|---|
| *H04N 19/136* | (2014.01) | |
| *H04N 19/109* | (2014.01) | |
| *H04N 19/176* | (2014.01) | |
| *H04N 19/52* | (2014.01) | |
| *H04N 19/56* | (2014.01) | |
| *H04N 19/96* | (2014.01) | |
| *H04N 19/61* | (2014.01) | |

(52) U.S. Cl.
CPC ........... *H04N 19/176* (2014.11); *H04N 19/52* (2014.11); *H04N 19/56* (2014.11); *H04N 19/61* (2014.11); *H04N 19/96* (2014.11)

(56) References Cited

OTHER PUBLICATIONS

Decision of Refusal in Japanese Patent Application No. 2012-067664, dated Dec. 9, 2014.
International Search Report in PCT International Application No. PCT/JP2013/001929, dated Jun. 25, 2013.
International Preliminary Report on Patentability and Written Opinion in PCT International Application No. PCT/JP2013/001929, dated Sep. 23, 2014.
Notification of Reasons for Refusal in Japanese Patent Application No. 2012-067664, dated Jul. 15, 2014.
Kondo et al., "AHG7: Modification of merge candidate derivation to reduce MC memory bandwith", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-8, Document: JCTVC-H0221.
U.S. Appl. No. 61/590,928, filed Jan. 26, 2012.

* cited by examiner

FIG.3

| PREDICTION BLOCK SIZE | | PARTITIONING MODE IN CU | | | |
|---|---|---|---|---|---|
| | | 2Nx2N (0) | 2NxN (1) | Nx2N (2) | NxN (3) |
| NUMBER OF CU PARTI- TIONINGS | 0 | 64x64 | 64x32 | 32x64 | – |
| | 1 | 32x32 | 32x16 | 16x32 | – |
| | 2 | 16x16 | 16x8 | 8x16 | – |
| | 3 | 8x8 | 8x4 | 4x8 | 4x4 |

ONE DIRECTION 1

ONE DIRECTION 2

TWO DIRECTIONS 1

TWO DIRECTIONS 2

FIG.17A

| INDEX | COMPARISON TARGET INDEX |
|---|---|---|
| 1 | 1 | 0 |
| 2 | 2 | 0 |
| 3 | 2 | 1 |
| 4 | 3 | 0 |
| 5 | 3 | 1 |
| 6 | 3 | 2 |

FIG.17B

| INDEX | COMPARISON TARGET INDEX |
|---|---|---|
| 1 | 1 | 0 |
| 2 | 2 | 0 |
| 3 | 2 | 1 |
| 4 | 3 | 0 |
| 5 | 3 | 1 |
| 6 | 3 | 2 |
| 7 | 4 | 0 |
| 8 | 4 | 1 |
| 9 | 4 | 2 |
| 10 | 4 | 3 |

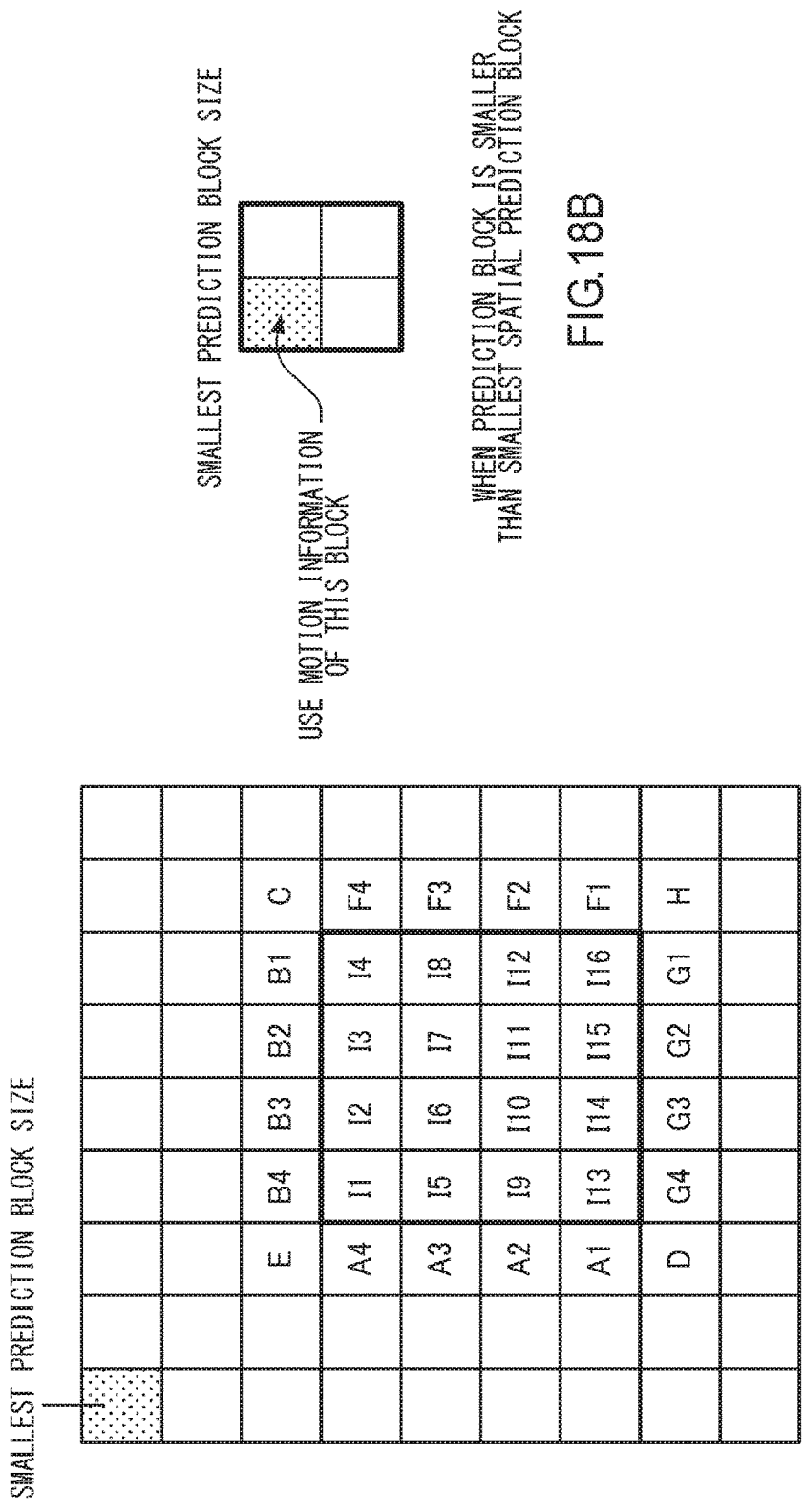

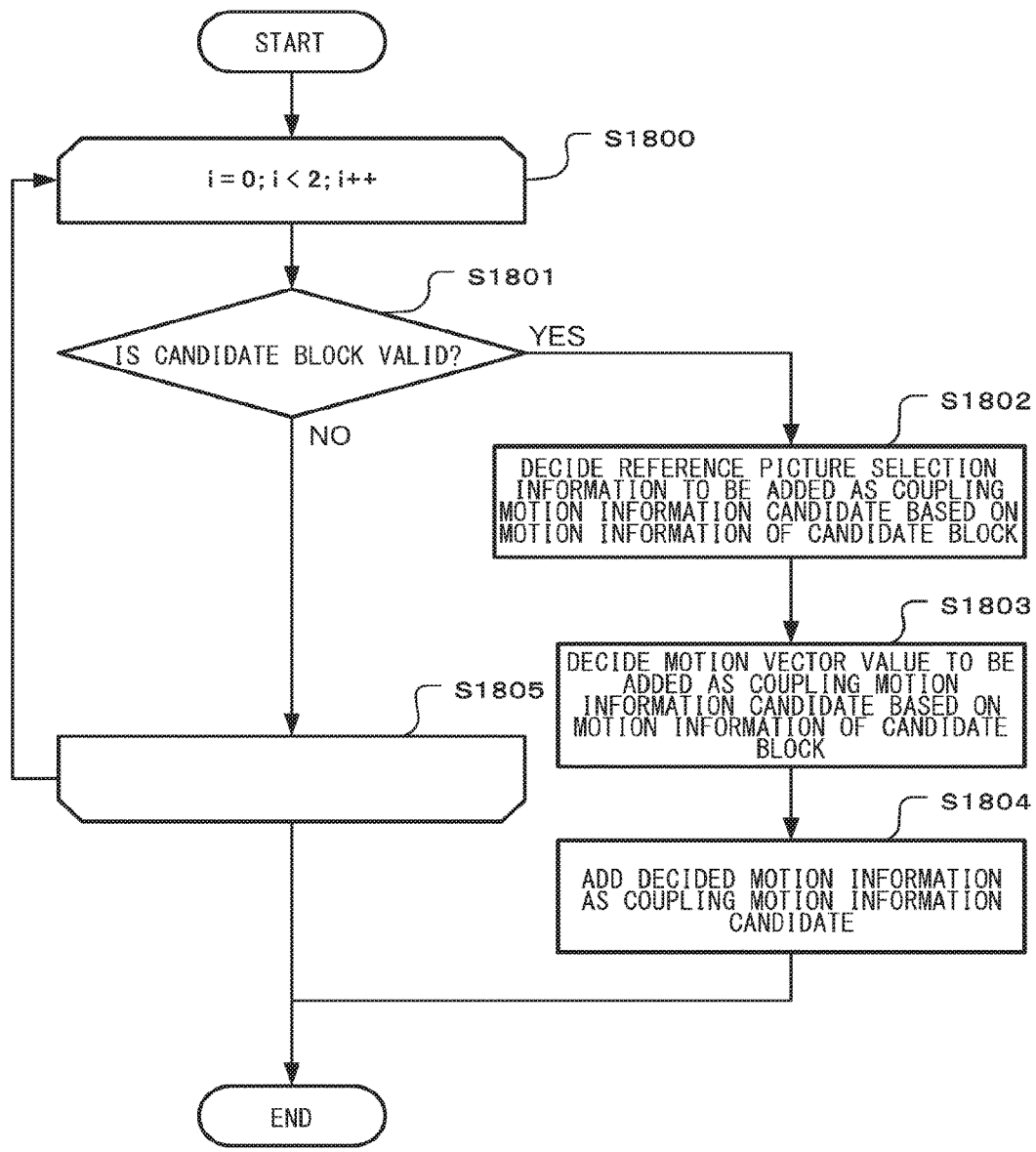

FIG.22

| loopTimes | M | N |
|---|---|---|
| 0 | 0 | 1 |
| 1 | 0 | 2 |
| 2 | 0 | 3 |
| 3 | 0 | 4 |
| 4 | 1 | 0 |
| 5 | 2 | 0 |
| 6 | 3 | 0 |
| 7 | 4 | 0 |

FIG.25

| Value (COUPLING MOTION INFORMATION INDEX) | codeNum |
|---|---|
| 0 | 0 |
| 1 | 10 |
| 2 | 110 |
| 3 | 1110 |
| 4 | 1111 |

FIG.32

| PREDICTION BLOCK |
|---|

```
if (PredMode == MODE_INTER) {
    merge_flag [ x0 ][ y0 ]
    if( merge_flag[ x0 ][ y0 ] ) {
        merge_idx [ x0 ][ y0 ]
    } else {
        If( slice_type == B )
            inter_pred_flag[ x0 ][ y0 ]
        if( inter_pred_flag[ x0 ][ y0 ] == Pred_L0 || inter_pred_flag[ x0 ][ y0 ] == Pred_BI ) {
            if( num_ref_idx_l0_active_minus1 > 0 )
                ref_idx_l0[ x0 ][ y0 ]
            mvd_l0[ x0 ][ y0 ][ 0 ]
            mvd_l0[ x0 ][ y0 ][ 1 ]
            mvp_flag_l0[ x0 ][ y0 ]
        }
        if( inter_pred_flag[ x0 ][ y0 ] == Pred_L1 || inter_pred_flag[ x0 ][ y0 ] == Pred_BI ) {
            if( num_ref_idx_l1_active_minus1 > 0 )
                ref_idx_l1[ x0 ][ y0 ]
            mvd_l1[ x0 ][ y0 ][ 0 ]
            mvd_l1[ x0 ][ y0 ][ 1 ]
            mvp_flag_l1[ x0 ][ y0 ]
        }
    }

⋮

}
``` though it is an object of the present invention to suppress# MOVING PICTURE CODING DEVICE AND MOVING PICTURE CODING METHOD

CROSS-REFERENCED TO RELATED APPLICATION

The present application is a Continuation Application of U.S. application Ser. No. 14/477,778, filed Sep. 4, 2014; which is a Continuation of International Application of PCT/JP2013/001929, filed Mar. 21, 2013; which in turn claims the benefit of Japanese Application No. 2012-067663, filed on Mar. 23, 2012; and Japanese Application No. 2012-067664, filed on Mar. 23, 2012, the disclosures of which Applications are incorporated by reference herein.

BACKGROUND OF THE INVENTION

1. Field of the Invention

The present invention relates to moving picture coding and decoding techniques using motion compensation prediction.

2. Description of the Related Art

In moving picture coding represented by MPEG-4 AVC/H.264 (hereinafter, "AVC") or the like, motion compensation prediction of partitioning a picture into rectangular blocks and performing motion estimation and compensation between pictures in units of blocks is used. In the motion compensation prediction, a prediction process is performed on a motion vector constructed in each block in order to reduce a coding amount.

In the AVC, a coding amount is reduced by calculating a prediction value from a neighboring block using a correlation relation with a motion vector of a neighboring block and coding a vector difference with the prediction value. However, in this prediction method, since a position of a neighboring block to be referred is limited, if prediction is wrong, there is a problem in that a motion vector difference increases, and a generated coding amount increases. Further, although a coding amount of a motion vector is reduced, other motion information such as a prediction or a reference picture index is coded for each processing target block, and thus there is a problem in that efficient coding is not performed.

In order to solve the problems, a merge coding technique of reducing a coding amount by coding additional information identifying a neighboring block to be referred from a plurality of neighboring blocks and performing coding using motion information of a neighboring block without coding motion information of a processing target block is used as in Patent Literature 1.

Patent Literature 1: JP 10-276439 A

In the merge coding, coding is performed using motion information of a spatially or temporally neighboring block without coding motion information of a processing target block, and thus a coding amount is reduced, and a coding efficiency is improved. Further, a plurality of candidates are prepared as a neighboring block to be referred, and additional information identifying a neighboring block to be referred is coded, and thus it is possible to refer to a neighboring block close to motion information of a coding target block.

For this reason, when the prediction type of the motion compensation prediction is automatically calculated, it is difficult to limit a prediction type of a prediction block having a size smaller than or equal to a certain prediction block size, and coding efficiency is likely to be lowered. When it is difficult to limit a prediction type of a prediction block having a size smaller than or equal to a certain prediction block size, for example, there are cases in which a problem occurs as a motion compensation prediction memory band is suppressed.

SUMMARY OF THE INVENTION

The present invention was made in light of the foregoing, and it is an object of the present invention to suppress motion information of motion compensation prediction and provide a technique of improving coding efficiency.

In order to solve the problem, according to an aspect of the present invention, a moving picture coding device that codes a moving picture using motion compensation prediction in units of blocks acquired by dividing each picture of the moving picture, includes: a motion information deriver (109) that derives motion information of a coding target block; a motion information changer (108) that changes the motion information derived by the motion information deriver for the coding target block having a size smaller than or equal to a certain size when the coding target block has the size smaller than or equal to the certain size; and a prediction signal constructor (108) that constructs a prediction signal of the coding target block through the motion compensation prediction using the motion information derived by the motion information deriver when the coding target block has a size larger than the certain size or using the motion information changed by the motion information changer when the coding target block has the size smaller than or equal to the certain size.

According to another aspect of the present invention, there is provided a moving picture coding device. The moving picture coding device that codes a moving picture using motion compensation prediction in units of blocks acquired by dividing each picture of the moving picture, includes: a motion information candidate list constructor (906) that constructs a motion information candidate list to which motion information candidates derived from motion information of blocks spatially or temporally neighboring a coding target block are added; a motion information encoder (110) that codes an index indicating certain motion information decided from among the motion information candidates added to the motion information candidate list; a motion information changer (108) that changes the derived certain motion information for the coding target block having a size smaller than or equal to a certain size when the coding target block has the size smaller than or equal to the certain size; and a prediction signal constructor (108) that constructs a prediction signal of the coding target block through the motion compensation prediction using the decided certain motion information when the coding target block has a size larger than the certain size or using the changed certain motion information when the coding target block has the size smaller than or equal to the certain size.

According to another aspect of the present invention, there is provided a moving picture coding method. The moving picture coding method of coding a moving picture using motion compensation prediction in units of blocks acquired by dividing each picture of the moving picture, includes: a motion information deriving step of deriving motion information of a coding target block; a motion information changing step of changing the motion information derived by the motion information deriver for the coding target block having a size smaller than or equal to a certain size when the coding target block has the size smaller than or equal to the certain size; and a prediction signal constructing step of constructing a prediction signal of the coding target block through the motion compensation prediction using the motion information derived by the motion information deriver when the coding target block has a size larger than the certain size or using the motion information changed by the motion information changer when the coding target block has the size smaller than or equal to the certain size.

According to another aspect of the present invention, there is provided a moving picture coding method. The moving picture coding method of coding a moving picture using motion compensation prediction in units of blocks acquired by dividing each picture of the moving picture, includes: a motion information candidate list constructing step of constructing a motion information candidate list to which motion information candidates derived from motion information of blocks spatially or temporally neighboring a coding target block are added; a motion information coding step of coding an index indicating certain motion information decided from among the motion information candidates added to the motion information candidate list; a motion information changing step of changing the derived certain motion information for the coding target block having a size smaller than or equal to a certain size when the coding target block has the size smaller than or equal to the certain size; and a prediction signal constructing step of constructing a prediction signal of the coding target block through the motion compensation prediction using the decided certain motion information when the coding target block has a size larger than the certain size or using the changed certain motion information when the coding target block has the size smaller than or equal to the certain size.

According to another aspect of the present invention, there is provided a transmitting device. The transmitting device includes: a packet processor that obtains a bitstream by packetizing a bitstream coded by a moving picture coding method of coding a moving picture using motion compensation prediction in units of blocks acquired by dividing each picture of the moving picture; and a transmitter that transmits the packetized bitstream. The moving picture coding method includes a motion information deriving step of deriving motion information of a coding target block, a motion information changing step of changing the motion information derived by the motion information deriver for the coding target block having a size smaller than or equal to a certain size when the coding target block has the size smaller than or equal to the certain size, and a prediction signal constructing step of constructing a prediction signal of the coding target block through the motion compensation prediction using the motion information derived by the motion information deriver when the coding target block has a size larger than the certain size or using the motion information changed by the motion information changer when the coding target block has the size smaller than or equal to the certain size.

According to another aspect of the present invention, there is provided a transmitting device. The transmitting device includes: a packet processor that obtains a bitstream by packetizing a bitstream coded by a moving picture coding method of coding a moving picture using motion compensation prediction in units of blocks acquired by dividing each picture of the moving picture; and a transmitter that transmits the packetized bit stream. The moving picture coding method includes a motion information candidate list constructing step of constructing a motion information candidate list to which motion information candidates derived from motion information of blocks spatially or temporally neighboring a coding target block are added, a motion information coding step of coding an index indicating certain motion information decided from among the motion information candidates added to the motion information candidate list, a motion information changing step of changing the derived certain motion information for the coding target block having a size smaller than or equal to a certain size when the coding target block has the size smaller than or equal to the certain size, and a prediction signal constructing step of constructing a prediction signal of the coding target block through the motion compensation prediction using the decided certain motion information when the coding target block has a size larger than the certain size or using the changed certain motion information when the coding target block has the size smaller than or equal to the certain size.

According to another aspect of the present invention, there is provided a transmission method. The transmission method includes: a packet processing step of obtaining a bitstream by packetizing a bitstream coded by a moving picture coding method of coding a moving picture using motion compensation prediction in units of blocks acquired by dividing each picture of the moving picture; and a transmitting step of transmitting the packetized bitstream. The moving picture coding method includes a motion information deriving step of deriving motion information of a coding target block, a motion information changing step of changing the motion information derived by the motion information deriver for the coding target block having a size smaller than or equal to a certain size when the coding target block has the size smaller than or equal to the certain size, and a prediction signal constructing step of constructing a prediction signal of the coding target block through the motion compensation prediction using the motion information derived by the motion information deriver when the coding target block has a size larger than the certain size or using the motion information changed by the motion information changer when the coding target block has the size smaller than or equal to the certain size.

According to another aspect of the present invention, there is provided a transmitting method. The transmitting method includes: a packet processing step of obtaining a bitstream by packetizing a bitstream coded by a moving picture coding method of coding a moving picture using motion compensation prediction in units of blocks acquired by dividing each picture of the moving picture; and a transmitting step of transmitting the packetized bitstream. The moving picture coding method includes a motion information candidate list constructing step of constructing a motion information candidate list to which motion information candidates derived from motion information of blocks spatially or temporally neighboring a coding target block are added, a motion information coding step of coding an index indicating certain motion information decided from among the motion information candidates added to the motion information candidate list, a motion information changing step of changing the derived certain motion information for the coding target block having a size smaller than or equal to a certain size when the coding target block has the size smaller than or equal to the certain size, and a prediction signal constructing step of constructing a prediction signal of the coding target block through the motion compensation prediction using the decided certain motion information when the coding target block has a size larger than the certain size or using the changed certain motion information when the coding target block has the size smaller than or equal to the certain size.

According to an aspect of the present invention, a moving picture decoding device that decodes a bitstream coded using motion compensation prediction in units of blocks acquired by dividing each picture of a moving picture, includes: a motion information deriver (606) that derives motion information of a decoding target block; a motion information changer (608) that changes the motion information derived by the motion information deriver for the decoding target block having a size smaller than or equal to a certain size when the decoding target block has the size smaller than or equal to the certain size; and a prediction signal constructor (608) that constructs a prediction signal of the decoding target block through the motion compensation prediction using the motion information derived by the motion information deriver when the decoding target block has a size larger than the certain size or using the motion information changed by the motion information changer when the decoding target block has the size smaller than or equal to the certain size.

According to another aspect of the present invention, there is provided a moving picture decoding device. The moving picture decoding device that decodes a bitstream coded using motion compensation prediction in units of blocks acquired by dividing each picture of a moving picture, includes: a motion information candidate list constructor (2604) that constructs a motion information candidate list to which motion information candidates derived from motion information of blocks spatially or temporally neighboring a decoding target block are added; a motion information decoder (606) that decodes an index indicating certain motion information to be selected from among the motion information candidates added to the motion information candidate list; a motion information changer (608) that selects the certain motion information from the motion information candidate list based on the decoded index, and changes the selected certain motion information for the decoding target block having a size smaller than or equal to a certain size when the decoding target block has the size smaller than or equal to the certain size; and a prediction signal constructor (608) that constructs a prediction signal of the decoding target block through the motion compensation prediction using the selected certain motion information when the decoding target block has a size larger than the certain size or using the changed certain motion information when the decoding target block has the size smaller than or equal to the certain size.

According to another aspect of the present invention, there is provided a moving picture decoding method. The moving picture decoding method of decoding a bitstream coded using motion compensation prediction in units of blocks acquired by dividing each picture of a moving picture, includes: a motion information deriving step of deriving motion information of a decoding target block; a motion information changing step of changing the motion information derived by the motion information deriver for the decoding target block having a size smaller than or equal to a certain size when the decoding target block has the size smaller than or equal to the certain size; and a prediction signal constructing step of constructing a prediction signal of the decoding target block through the motion compensation prediction using the motion information derived by the motion information deriver when the decoding target block has a size larger than the certain size or using the motion information changed by the motion information changer when the decoding target block has the size smaller than or equal to the certain size.

According to another aspect of the present invention, there is provided a moving picture decoding method. The moving picture decoding method of decoding a bitstream coded using motion compensation prediction in units of blocks acquired by dividing each picture of a moving picture, includes: a motion information candidate list constructing step of constructing a motion information candidate list to which motion information candidates derived from motion information of blocks spatially or temporally neighboring a decoding target block are added; a motion information decoding step of decoding an index indicating certain motion information to be selected from among the motion information candidates added to the motion information candidate list; a motion information changing step of selecting the certain motion information from the motion information candidate list based on the decoded index, and changes the selected certain motion information for the decoding target block having a size smaller than or equal to a certain size when the decoding target block has the size smaller than or equal to the certain size; and a prediction signal constructing step of constructing a prediction signal of the decoding target block through the motion compensation prediction using the selected certain motion information when the decoding target block has a size larger than the certain size or using the changed certain motion information when the decoding target block has the size smaller than or equal to the certain size.

According to another aspect of the present invention, there is provided a receiving device. The receiving device that receives a bitstream obtained by coding a moving picture and decodes the bitstream, includes: a receiver that receives a bitstream obtained by packetizing a bitstream obtained by coding the moving picture using motion compensation prediction in units of blocks acquired by dividing each picture of the moving picture; a reconstructor that performs packet processing the received packetized bitstream and reconstructs an original; a motion information deriver that derives motion information of a decoding target block; a motion information changer that changes the motion information derived by the motion information deriver for the decoding target block having a size smaller than or equal to a certain size when the decoding target block has the size smaller than or equal to the certain size; and a prediction signal constructor that constructs a prediction signal of the coding target block through the motion compensation prediction using the motion information derived by the motion information deriver when the coding target block has a size larger than the certain size or using the motion information changed by the motion information changer when the coding target block has the size smaller than or equal to the certain size.

According to another aspect of the present invention, there is provided a receiving device. The receiving device that receives a bitstream obtained by coding a moving picture and decodes the bitstream, includes: a receiver that receives a bitstream obtained by packetizing a bitstream obtained by coding the moving picture using motion compensation prediction in units of blocks acquired by dividing each picture of the moving picture; a reconstructor that performs packet processing the received packetized bitstream and reconstructs an original; a motion information candidate list constructor that constructs a motion information candidate list to which motion information candidates derived from motion information of blocks spatially or temporally neighboring a coding target block are added; a motion information decoder that decodes an index indicating certain motion information to be selected from among the motion information candidates added to the motion information candidate list from the reconstructed original bitstream; a motion information changer that selects the certain motion information from the motion information candidate list based on the decoded index, and changes the selected certain motion information for the decoding target block having a size smaller than or equal to a certain size when the coding target block has the size smaller than or equal to the certain size; and a prediction signal constructor that constructs a prediction signal of the decoding target block through the motion compensation prediction using the selected certain motion information when the coding target block has a size larger than the certain size or using the changed certain motion information when the coding target block has the size smaller than or equal to the certain size.

According to another aspect of the present invention, there is provided a reception method. The reception method of receiving a bitstream obtained by coding a moving picture and decodes the bitstream, includes: a receiving step of receiving a bitstream obtained by packetizing a bitstream obtained by coding the moving picture using motion compensation prediction in units of blocks acquired by dividing each picture of the moving picture; a reconstructing step of performing packet processing the received packetized bitstream and reconstructs an original; a motion information deriving step of deriving motion information of a decoding target block; a motion information changing step of changing the motion information derived by the motion information deriver for the decoding target block having a size smaller than or equal to a certain size when the decoding target block has the size smaller than or equal to the certain size; and a prediction signal constructing step of constructing a prediction signal of the coding target block through the motion compensation prediction using the motion information derived by the motion information deriver when the coding target block has a size larger than the certain size or using the motion information changed by the motion information changer when the coding target block has the size smaller than or equal to the certain size.

According to another aspect of the present invention, there is provided a reception method. The reception method of receiving a bitstream obtained by coding a moving picture and decodes the bitstream, includes: a receiving step of receiving a bitstream obtained by packetizing a bitstream obtained by coding the moving picture using motion compensation prediction in units of blocks acquired by dividing each picture of the moving picture; a reconstructing step of performing packet processing the received packetized bitstream and reconstructs an original; a motion information candidate list constructing step of constructing a motion information candidate list to which motion information candidates derived from motion information of blocks spatially or temporally neighboring a coding target block are added; a motion information decoding step of decoding an index indicating certain motion information to be selected from among the motion information candidates added to the motion information candidate list from the reconstructed original bitstream; a motion information changing step of selecting the certain motion information from the motion information candidate list based on the decoded index, and changes the selected certain motion information for the decoding target block having a size smaller than or equal to a certain size when the coding target block has the size smaller than or equal to the certain size; and a prediction signal constructing step of constructing a prediction signal of the decoding target block through the motion compensation prediction using the selected certain motion information when the coding target block has a size larger than the certain size or using the changed certain motion information when the coding target block has the size smaller than or equal to the certain size.

Further, an embodiment obtained by exchanging an arbitrary combination of the above components and an expression of the present invention among a method, a device, a system, a recording medium, a computer program, and the like is also effective as an aspect of the present invention.

BRIEF DESCRIPTION OF THE DRAWINGS

FIG. 3 is a diagram illustrating a detailed definition of a prediction block size;

FIGS. 17A and 17B are diagrams illustrating a comparative relation of a motion information candidate in coupling motion information candidate deletion according to an embodiment;

FIGS. 18A and 18B are diagrams illustrating a temporal candidate block group used for temporal coupling motion information candidate list construction;

FIG. 19 is a flowchart for describing a detailed operation of temporal coupling motion information candidate list construction;

FIG. 22 is a diagram for describing a relation among the number of combination inspections, a coupling motion information candidate M, and a coupling motion information candidate N;

FIG. 25 is a diagram illustrating a Truncated Unary bitstream when the number of coupling motion information candidates is 5;

FIG. 32 illustrates syntax related to motion information of a prediction block.

DETAILED DESCRIPTION

Figure 1:
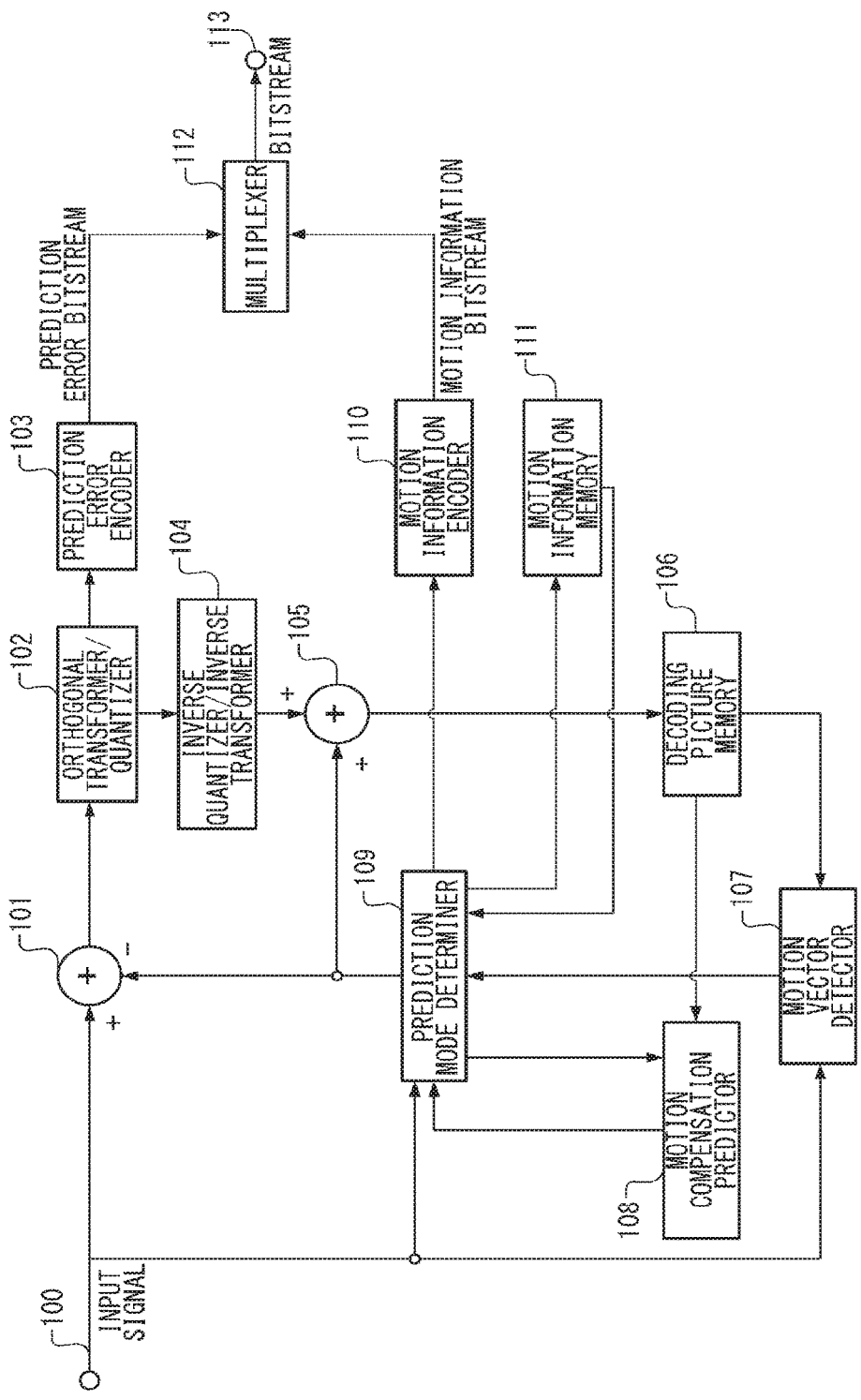
FIG. 1 is a diagram illustrating a configuration of a moving picture coding device according to an embodiment of the present invention.

The invention will now be described by reference to the preferred embodiments. This does not intend to limit the scope of the present invention, but to exemplify the invention.

Hereinafter, a moving picture coding device, a moving picture coding method, a moving picture coding program, a moving picture decoding device, a moving picture decoding method, and a moving picture decoding program according to exemplary embodiments of the present invention will be described in detail with reference to the appended drawings. In the drawings, the same components are denoted by the same reference numerals, and a description thereof will not be repeated.

[Overall Configuration of Moving Picture Coding Device]

FIG. 1 is a diagram illustrating a configuration of a moving picture coding device according to an embodiment of the present invention. An operation of each component is now described. The moving picture coding device according to an embodiment includes an input terminal 100, a subtractor 101, an orthogonal transformer/quantizer 102, a prediction error encoder 103, an inverse quantizer/inverse transformer 104, an adder 105, a decoded picture memory 106, a motion vector detector 107, a motion compensation predictor 108, a prediction mode determiner 109, a motion information encoder 110, a motion information memory 111, a multiplexer 112, and an output terminal 113.

A picture signal of a prediction block of a coding process target is clipped from a picture signal input from the input terminal 100 based on positional information and a prediction block size of the prediction block, and the picture signal of the prediction block is supplied to the subtractor 101, the motion vector detector 107, and the prediction mode determiner 109.

Figure 2:
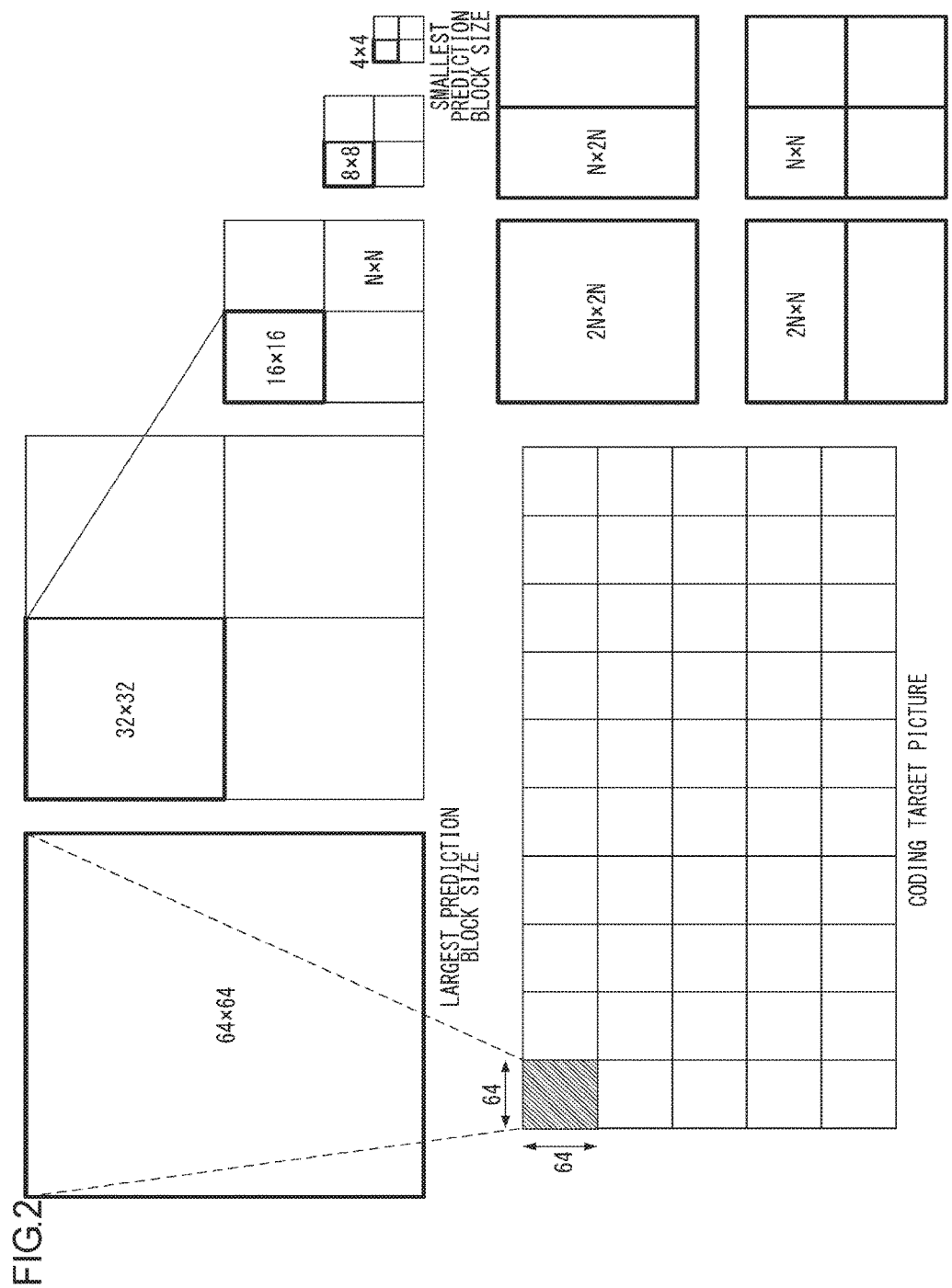
FIG. 2 is a diagram illustrating an exemplary coding target picture.

FIG. 2 is a diagram illustrating an exemplary coding target picture. For a prediction block size according to an embodiment, a coding target picture is subjected to a coding process in units of coding blocks (CUs) of 64.times.64 pixels, and prediction blocks are configured in units into which a coding block is further partitioned as illustrated in FIG. 2. The largest prediction block size is 64.times.64 pixels which is identical to a coding block, and the smallest prediction block size is 4.times.4 pixels. As a partition structure for partitioning a coding block into prediction blocks, 2N.times.2N in which no partitioning is performed, N.times.N in which partitioning is performed in both the horizontal direction and the vertical direction, (2N.times.N) in which partitioning is performed only in the horizontal direction, and (N.times.2N) in which partitioning is performed only in the vertical direction can be used. When partitioning is performed in both the horizontal direction and the vertical direction, a prediction block can be further hierarchically partitioned into prediction blocks using a partitioned prediction block as a coding block, and a hierarchy thereof is expressed by the number of CU partitionings.

FIG. 3 is a diagram illustrating a detailed definition of a prediction block size. There are 13 prediction block sizes from 64.times.64 pixels that is the largest prediction block size in which the number of CU partitionings is 0 to 4.times.4 pixels that is the smallest prediction block size in which the number of CU partitionings is 3.

The partition structures of the prediction block according to the embodiment of the present invention are not limited to the above combinations. Further, selection of a prediction block size in a moving picture coding device can be performed such that a structure having good coding efficiency is adaptively selected in units of coding blocks. However, the embodiment is more focused on coding of inter prediction and inter motion information in units of prediction blocks, and thus a component related to selection of an optimal prediction block size and a description thereof are omitted. For an operation of a moving picture coding device which will be described later, an operation performed in units of selected prediction block sizes will be described.

Referring back to FIG. 1, the subtractor 101 calculates a prediction error signal by subtracting a prediction signal supplied from the prediction mode determiner 109 from a picture signal supplied from the input terminal 100, and supplies the prediction error signal to the orthogonal transformer/quantizer 102.

The orthogonal transformer/quantizer 102 performs orthogonal transform and quantization on the prediction error signal supplied from the subtractor 101, and supplies the quantized prediction error signal to the prediction error encoder 103 and the inverse quantizer/inverse transformer 104.

The prediction error encoder 103 performs entropy coding on the quantized prediction error signal supplied from the orthogonal transformer/quantizer 102, constructs a bitstream for the prediction error signal, and supplies the bitstream to the multiplexer 112.

The inverse quantizer/inverse transformer 104 constructs a decoded prediction error signal by performing processing such as inverse quantization and inverse orthogonal transform on the quantized prediction error signal supplied from the orthogonal transformer/quantizer 102, and supplies the decoded prediction error signal to the adder 105.

The adder 105 constructs a decoded picture signal by adding the decoded prediction error signal supplied from the inverse quantizer/inverse transformer 104 to the prediction signal supplied from the prediction mode determiner 109, and supplies the decoded picture signal to the decoded picture memory 106.

The decoded picture memory 106 stores the decoded picture signal supplied from the adder 105. Further, for a decoded picture obtained as an overall picture is decoded, the decoded picture memory 106 stores a certain number (which is larger than or equal to one) of pictures as a reference picture, and supplies a reference picture signal to the motion vector detector 107 and the motion compensation predictor 108.

The motion vector detector 107 receives the picture signal of the prediction block supplied from the input terminal 100 and an input of the reference picture signal stored in the decoded picture memory 106, detects a motion vector on each reference picture, and supplies a motion vector value to the prediction mode determiner 109.

Commonly, a motion vector is detected such that an error evaluation value on a picture signal corresponding to a reference picture shifted from the same position as a picture signal by a certain shift amount is calculated, and a shift amount that causes the error evaluation value to be minimum is used as a motion vector. As the error evaluation value, a sum of absolute difference (SAD) of each pixel, a sum of square error (SSE) of each pixel, or the like is used. Further, a coding amount related to a coding of a motion vector can be included in the error evaluation value.

The motion compensation predictor 108 derives the picture signal at the position obtained by shifting the reference picture indicated by reference picture designation information in the decoded picture memory 106 from the same position as the picture signal of the prediction block by the motion vector value by according to a prediction type designated by the prediction mode determiner 109, the reference picture designation information, the motion vector value, and the bi-prediction restriction information, and constructs the prediction signal.

A prediction signal derived from a one reference picture is used as a motion compensation prediction signal when the prediction mode designated by the prediction mode determiner 109 is the single prediction, a signal obtained by averaging prediction signals derived from two reference pictures is used as a motion compensation prediction signal when the prediction mode is the bi-prediction, and the motion compensation prediction signal is supplied to the prediction mode determiner 109. Here, an averaging ratio of the bi-prediction is assumed to be 1:1.

In the present embodiment, there are cases in which the motion compensation prediction is performed in a prediction type different from the prediction type designated by the prediction mode determiner 109. In other words, in the motion compensation predictor 108, the prediction type is changed based on the bi-prediction restriction information, and the motion compensation prediction is performed. The details of the motion compensation prediction in the prediction type different from the designated prediction type will be described later.

FIGS. 4A to 4D are diagrams for describing the prediction type of the motion compensation prediction. A process of performing prediction using a single reference picture is defined as single prediction, and in the case of the single prediction, one of reference pictures added to two reference picture management lists such as L0 prediction or L1 prediction is used.

Figure 4A:
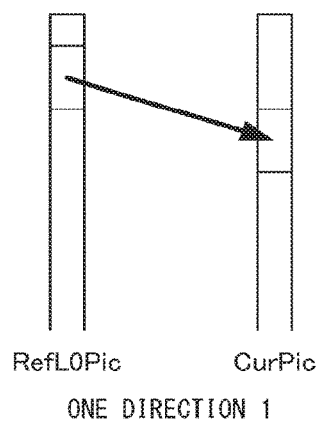
FIGS. 4A to 4D are diagrams for describing a prediction type of motion compensation prediction.
Figure 4B:
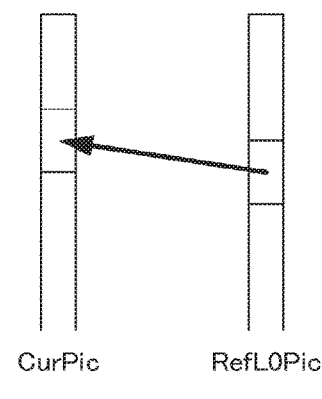

FIG. 4A illustrates an example in which in the case of the single prediction, a reference picture (RefL0Pic) of L0 prediction is temporally ahead of a coding target picture (CurPic). FIG. 4B illustrates an example in which in the case of the single prediction, a reference picture of L0 prediction is temporally behind a coding target picture. Similarly, the single prediction can be performed in a state in which the reference pictures of L0 prediction of FIGS. 4A and 4B are replaced with reference pictures (RefL1Pic) of L1 prediction.

Figure 4C:
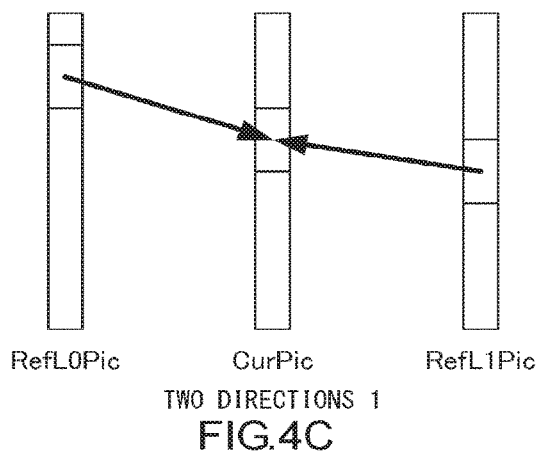
Figure 4D:
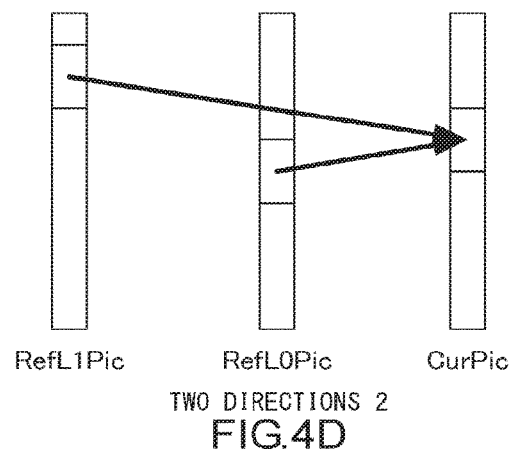

A process of performing prediction using two reference pictures is defined as the bi-prediction, and in the case of the bi-prediction, it is expressed as BI prediction using both L0 prediction and L1 prediction. FIG. 4C illustrates an example in which in the case of the bi-prediction, the reference pictures of L0 prediction is temporally ahead of a coding target picture, and the reference pictures of L1 prediction is temporally behind of a coding target picture. FIG. 4D illustrates an example in which in the case of the bi-prediction, the reference pictures of L0 prediction and the reference pictures of L1 prediction are orally ahead of a coding target picture. As described above, a relation between the prediction type of L0/L1 and a time can be used without being limited to an example in which L0 is a past direction, and L1 is a future direction.

In the bi-prediction, since it is necessary to access picture information from two reference picture memories, there are cases in which as twice or more memory bands as the single prediction are necessary. In the case of configuring hardware, when the prediction block size of the motion compensation prediction is small, the bi-prediction undergoes a memory band bottleneck, and in the present embodiment, a memory band bottleneck is suppressed.

Referring back to FIG. 1, the prediction mode determiner 109 sets the prediction type, the reference picture designation information, the motion vector value, and the bi-prediction restriction information which are used in each motion compensation prediction mode defined in the embodiment to the motion compensation predictor 108 based on the motion vector value detected on each reference picture input from the motion vector detector 107 and the motion information (the prediction type, the motion vector value, and the reference picture designation information) stored in the motion information memory 111. Based on the set values, an optimal motion compensation prediction mode is decided using the motion compensation prediction signal supplied from the motion compensation predictor 108 and the picture signal of the prediction block supplied from the input terminal 100.

The prediction mode determiner 109 supplies the decided prediction mode and information specifying the prediction type, the motion vector, and the reference picture designation information according to the prediction mode to the motion information encoder 110, supplies the decided prediction mode and the prediction type, the motion vector value, and the reference picture designation information for the prediction mode to the motion information memory 111, and supplies the prediction signal corresponding to the decided prediction mode to the subtractor 101 and the adder 105.

In the moving picture coding device, intra prediction of performing prediction using a coded picture in the same screen is performed in order to code a reference picture used as a reference, but since the embodiment is focused on inter prediction, components related to intra prediction are omitted. A detailed configuration of the prediction mode determiner 109 will be described later.

The motion information encoder 110 codes the prediction mode and the information specifying the prediction type, the motion vector, and the reference picture designation information according to the prediction mode supplied from the prediction mode determiner 109 according to a certain syntax structure, constructs a bitstream of motion information, and supplies the bitstream to the multiplexer 112.

The motion information memory 111 stores the motion information (the prediction type, the motion vector, and the reference picture index) supplied from the prediction mode determiner 109 by a certain number of pictures in smallest prediction block size units. Motion information of neighboring blocks of a prediction block of a processing target is assumed to be a spatial candidate block group, and motion information of a block on ColPic at the same position as a prediction block of a processing target and a neighboring block thereof are assumed to be a temporal candidate block group.

ColPic is a decoded picture different from a prediction block of a processing target and stored in the decoded picture memory 106 as the reference picture. In the embodiment, ColPic is assumed to be a most recently decoded reference picture. Further, in the embodiment, ColPic is assumed to be a most recently decoded reference picture but may be a last reference picture in a display order or a next reference picture in a display order, and it is possible to designate a reference picture used as ColPic directly in a bitstream.

The motion information memory 111 supplies motion information of a spatial candidate block group and a temporal candidate block group to the prediction mode determiner 109 as motion information of a group of candidate blocks. The multiplexer 112 constructs a bitstream by multiplexing a bitstream of a prediction error supplied from the prediction error encoder 103 and a bitstream of the motion information supplied from the motion information encoder 110, and outputs the bitstream to a recording medium, a transmission path, or the like through the output terminal 113.

The configuration of the moving picture coding device illustrated in FIG. 1 can be implemented by hardware such as an information processing device including a central processing unit (CPU), a frame memory, a hard disk, and the like.

Figure 5:
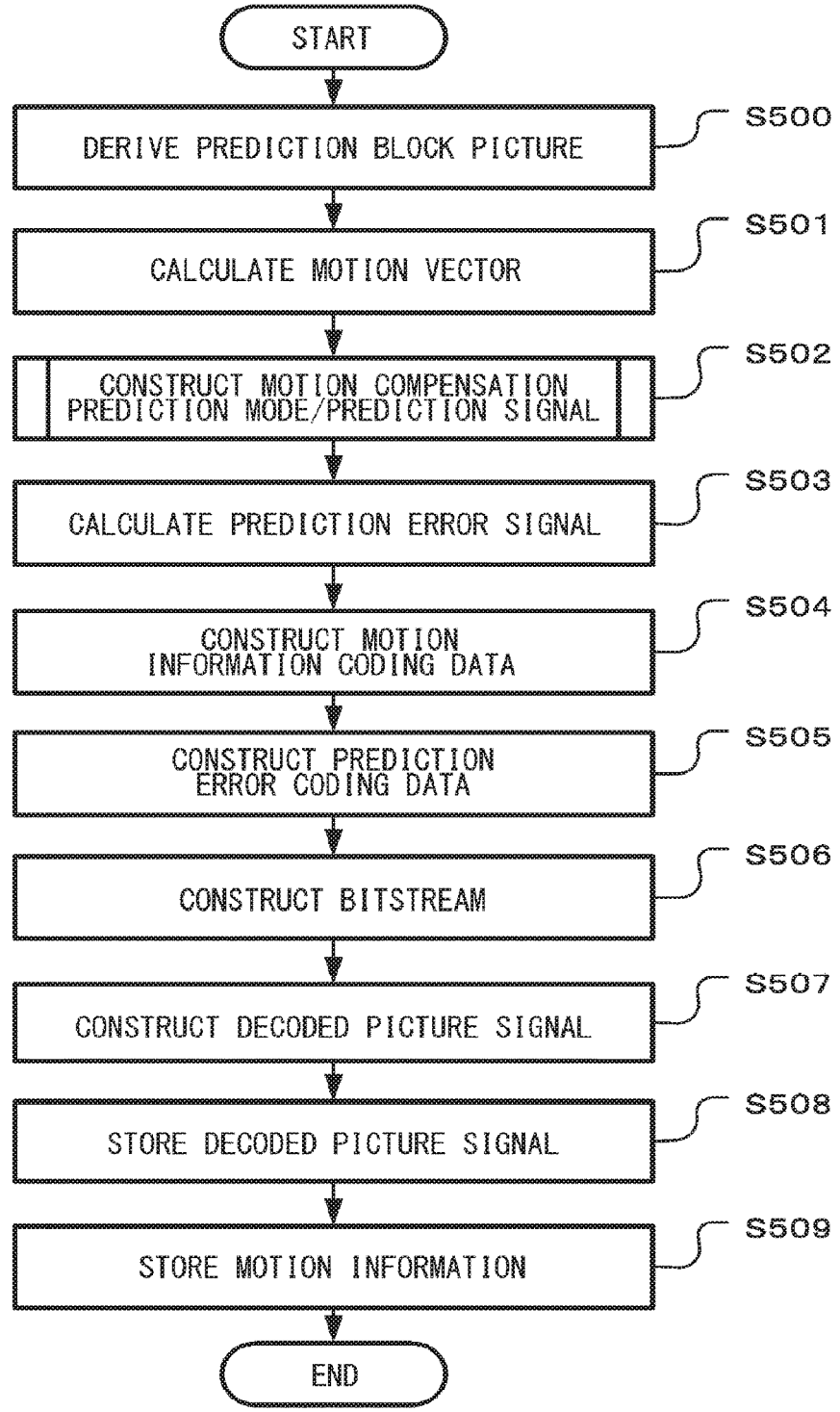
FIG. 5 is a flowchart illustrating an operation flow of a coding process in a moving picture coding device according to an embodiment of the present invention.

FIG. 5 is a flowchart illustrating an operation flow of a coding process in the moving picture coding device according to the embodiment of the present invention. A prediction block picture of a processing target is derived from the input terminal 100 in units of predictions blocks (S500). The motion vector detector 107 calculates a motion vector value of each reference picture from the prediction block picture of the processing target and a plurality of reference pictures stored in the decoded picture memory 106 (S501).

Then, the prediction mode determiner 109 derives the prediction signal for each motion compensation prediction mode defined in the embodiment using the motion vector supplied from the motion vector detector 107 and the motion information stored in the motion information memory 111 using the motion compensation predictor 108, selects an optimal prediction mode, and constructs the prediction signal (S502). The details of the process of step S502 will be described later.

Then, the subtractor 101 calculates a difference between the prediction block picture of the processing target and the prediction signal supplied from the prediction mode determiner 109 as the prediction error signal (S503). The motion information encoder 110 codes the prediction mode and the information specifying the prediction type, the motion vector, and the reference picture designation information according to the prediction mode supplied from the prediction mode determiner 109 according to a certain syntax structure, and constructs coding data of the motion information (S504).

Then, the prediction error encoder 103 performs entropy coding on the quantized prediction error signal constructed by the orthogonal transformer/quantizer 102, and constructs coding data of the prediction error (S505). The multiplexer 112 multiplexes the coding data of the motion information supplied from the motion information encoder 110 and the coding data of the prediction error supplied from the prediction error encoder 103, and constructs a bitstream (S506).

The adder 105 adds the decoded prediction error signal supplied from the inverse quantizer/inverse transformer 104 to the prediction signal supplied from the prediction mode determiner 109, and constructs the decoded picture signal (S507). The decoded picture signal constructed by the adder 105 is supplied to and stored in the decoded picture memory 106, and then used in a motion compensation prediction process of a coding picture to be coded (S508). The motion information memory 111 stores the motion information (the prediction type, the motion vector, and the reference picture designation information) supplied from the motion vector detector 107 in smallest prediction block size units (S509).

[Overall Configuration of Moving Picture Decoding Device]

Figure 6:
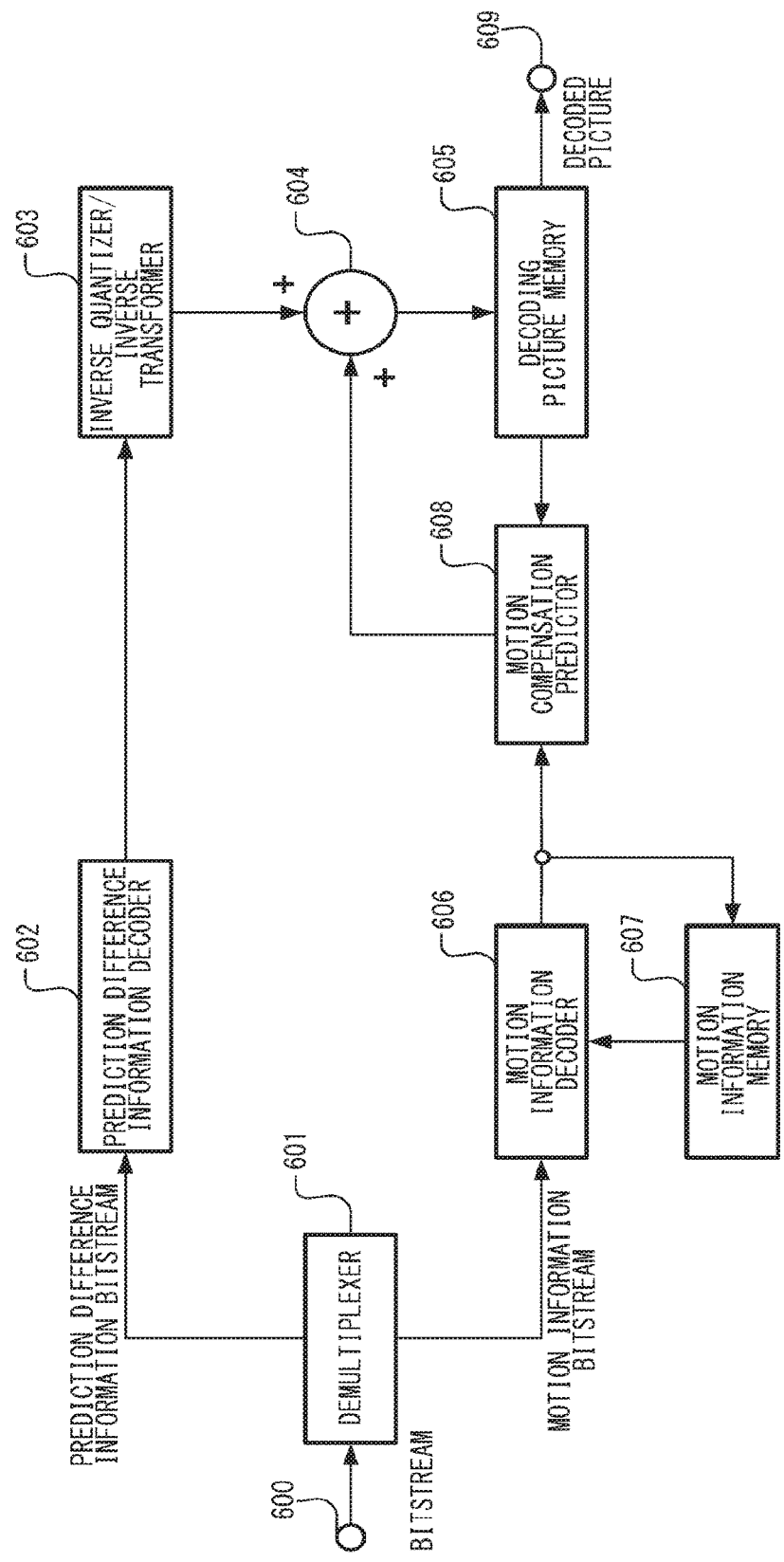
FIG. 6 is a diagram illustrating a configuration of a moving picture decoding device according to an embodiment of the present invention.

FIG. 6 is a diagram illustrating a configuration of the moving picture decoding device according to the embodiment of the present invention. An operation of each component is now described. The moving picture decoding device according to the embodiment includes an input terminal 600, a demultiplexer 601, a prediction difference information decoder 602, an inverse quantizer/inverse transformer 603, an adder 604, a decoded picture memory 605, a motion information decoder 606, a motion information memory 607, a motion compensation predictor 608, and an output terminal 609.

A bitstream is supplied from the input terminal 600 to the demultiplexer 601. The demultiplexer 601 demultiplexes a bitstream of the supplied bitstream into a bitstream of prediction error information and a bitstream of motion information configured with information specifying the prediction mode, the prediction type, the motion vector, and the reference picture designation information. The bitstream of the prediction error information is supplied to the prediction difference information decoder 602, and the bitstream of the motion information is supplied to the motion information decoder 606.

The prediction difference information decoder 602 decodes the bitstream of the prediction error information supplied from the demultiplexer 601, and constructs the quantized prediction error signal. The prediction difference information decoder 602 supplies the constructed quantized prediction error signal to the inverse quantizer/inverse transformer 603.

The inverse quantizer/inverse transformer 603 constructs the prediction error signal by performing processing such as inverse quantization and inverse orthogonal transform on the quantized prediction error signal supplied from the prediction difference information decoder 602, and supplies the decoded prediction error signal to the adder 604.

The adder 604 constructs the decoded picture signal by adding the decoded prediction error signal supplied from the inverse quantizer/inverse transformer 603 to the prediction signal supplied from the motion compensation predictor 608, and supplies the decoded picture signal to the decoded picture memory 605.

The decoded picture memory 605 has the same function as the decoded picture memory 106 in the moving picture coding device of FIG. 1, and stores the decoded picture signal supplied from the adder 604 and supplies the reference the picture signal to the motion compensation predictor 608. Further, the decoded picture memory 605 supplies the stored decoded picture signals to the output terminal 609 in a picture display order in accordance with a display time.

The motion information decoder 606 decodes the information specifying the prediction mode, the prediction type, the motion vector, and the reference picture designation information as the motion information from the bitstream of the motion information supplied from the demultiplexer 601. The prediction type, the motion vector and the reference picture designation information that are used for the motion compensation prediction are reproduced based on the decoded motion information and the motion information of a group of candidate blocks supplied from the motion information memory 607, and then supplied to the motion compensation predictor 608. Further, the motion information decoder 606 supplies the reproduced motion information to the motion information memory 607. A detailed configuration of the motion information decoder 606 will be described later.

The motion information memory 607 has the same function as the motion information memory 111 in the moving picture coding device of FIG. 1, and stores the reproduced motion information supplied from the motion information decoder 606 in smallest prediction block size units by a certain number of pictures. Further, the motion information memory 607 supplies the motion information of a spatial candidate block group and a temporal candidate block group to the motion information decoder 606 as the motion information of a group of candidate blocks.

The motion compensation predictor 608 has the same function as the motion compensation predictor 108 in the moving picture coding device of FIG. 1, and derives the picture signal at the position obtained by shifting the reference picture indicated by reference picture designation information in the decoded picture memory 605 from the same position as the picture signal of the prediction block by the motion vector value by based on the motion information supplied from the motion information decoder 606, and constructs the prediction signal. When the prediction type of the motion compensation prediction is the bi-prediction, the prediction signal is constructed by averaging the prediction signals of the respective prediction types, and the prediction signal is supplied to the adder 604. Here, for a prediction block in which the bi-prediction is restricted, even when the prediction type is the bi-prediction, the prediction signal is constructed using the single prediction.

As described in the coding device of the present embodiment, in the present embodiment, there are cases in which the motion compensation prediction is performed based on the reference picture designation information different from the reference picture designation information designated by the motion information decoder 606. In other words, in the motion compensation predictor 608, the prediction type is changed based on the prediction type and the bi-prediction restriction information, and the motion compensation prediction is performed. The details of the motion compensation prediction of the prediction type different from the designated prediction type will be described later.

The output terminal 609 outputs the decoded picture signal supplied from the decoded picture memory 605 to a display medium such as a display device, and thus the decoded picture signal is reproduced.

The configuration of the moving picture decoding device illustrated in FIG. 6 can be also implemented by hardware such as an information processing device including a CPU, a frame memory, a hard disk, and the like, similarly to the configuration of the moving picture coding device illustrated in FIG. 1.

Figure 7:
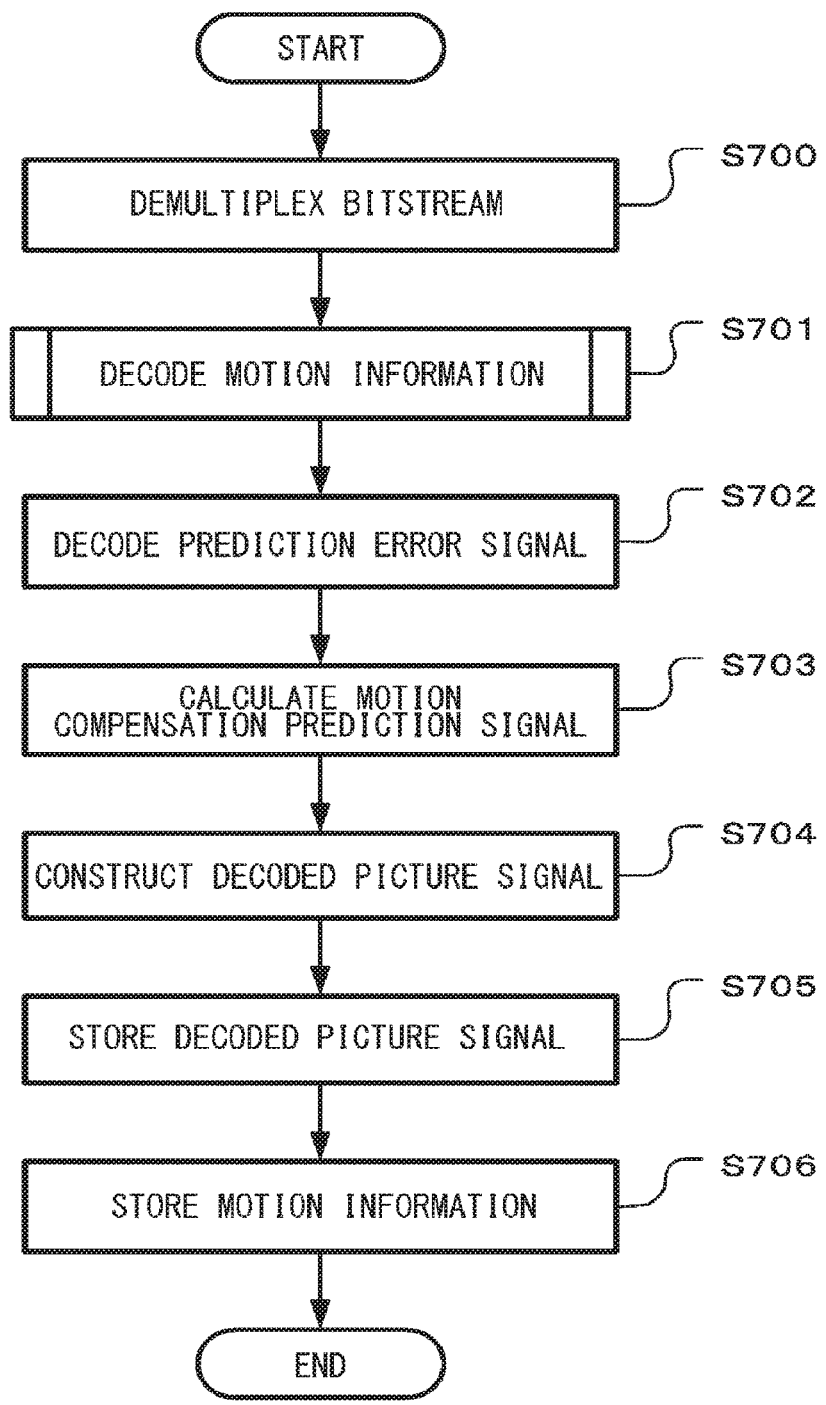
FIG. 7 is a flowchart illustrating an operation flow of a decoding process in a moving picture decoding device according to an embodiment of the present invention.

FIG. 7 is a flowchart illustrating an operation flow of the decoding process in the moving picture decoding device according to the embodiment of the present invention. The demultiplexer 601 demultiplexes the bitstream supplied from the input terminal 600 into the bitstream of the prediction error information and the bitstream of the motion information (S700). The demultiplexed bitstream of the motion information is supplied to the motion information decoder 606, and the motion information of the decoding target block is decoded using motion information of a group of candidate blocks supplied from the motion information memory 607 (S701). The details of the process of step S701 will be described later.

The demultiplexed bitstream of the prediction error information is supplied to the prediction difference information decoder 602, decoded as the quantized prediction error signal, and subjected to processing such as inverse quantization and inverse orthogonal transform performed through the inverse quantizer/inverse transformer 603, so that the decoded prediction error signal is constructed (S702).

The motion information decoder 606 supplies the motion information of the decoding target block to the motion compensation predictor 608, and the motion compensation predictor 608 performs the motion compensation prediction according to the motion information, and calculates the prediction signal (S703). The adder 604 adds the decoded prediction error signal supplied from the inverse quantizer/inverse transformer 603 to the prediction signal supplied from the motion compensation predictor 608, and constructs the decoded picture signal (S704).

The decoded picture signal supplied from the adder 604 is stored in the decoded picture memory 605 (S705), and the motion information of the decoding target block supplied from the motion information decoder 606 is stored in the motion information memory 607 (S706). Then, the decoding process performed in units of prediction blocks ends.

Detailed Function Description of the Embodiment

Next, an operation of the prediction mode determiner 109 in the moving picture coding device according to the embodiment of the present invention, the process of step S502 in the flowchart of FIG. 5, an operation of the motion information decoder 606 in the moving picture decoding device according to the embodiment of the present invention, and the process of step S701 in the flowchart of FIG. 7 will be described in detail.

Definition of Motion Compensation Prediction Mode in the Embodiment

Figures 8A, 8B:
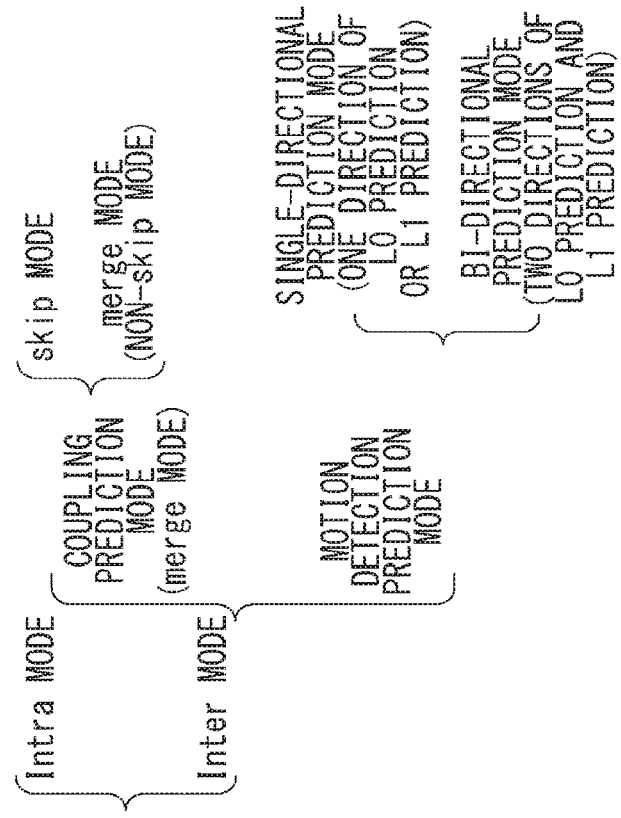
FIGS. 8A and 8B are diagrams for describing two prediction modes for coding motion information used in motion compensation prediction according to an embodiment of the present invention.

FIGS. 8A and 8B are diagrams for describing two prediction modes for coding the motion information used in the motion compensation prediction according to the embodiment of the present invention. A first prediction mode is a technique of not coding motion information of a prediction target block directly but using motion information of a spatially and temporally neighboring block for coding using continuity of motion in a temporal direction or a spatial direction between the prediction target block and a coded block neighboring the prediction target block, and referred to as a coupling prediction mode (merge mode).

A first prediction mode is a technique of not coding motion information of a prediction target block directly but using motion information of a spatially and temporally neighboring block for coding using continuity of motion in a temporal direction or a spatial direction between the prediction target block and a coded block neighboring the prediction target block, and referred to as a coupling prediction mode (merge mode).

Here, a spatially neighboring block refers to a block neighboring the prediction target block among coded blocks belonging to the same picture as the prediction target block. Here, a temporally neighboring block refers to a block that is at the same position as or in the neighborhood of a prediction target block among blocks belonging to a coded picture different from a picture that the prediction target block belongs.

In the case of the coupling prediction mode, it is possible to define motion information to be selectively coupled from a plurality of neighboring block candidates, and as information (index) designating a neighboring block to be used is coded, motion information derived based on designation information is used for motion compensation prediction without change. Further, in the coupling prediction mode, a skip mode in which prediction difference information is not coded and transmitted, and a prediction signal predicted in the coupling prediction mode is used as a decoded picture is defined, and it is possible to reproduce a decoded picture using small information of the coupled motion information. Motion information transmitted in the skip mode is designation information defining a neighboring block, similarly to the coupling prediction mode.

A second prediction mode is a technique of individually coding all elements of motion information and transmitting small motion information of a prediction error on a prediction block and referred to as a motion detection prediction mode. In the motion detection prediction mode, similarly to coding of motion information of motion compensation prediction according to a related art, a prediction type indicating the bi-prediction or the single prediction, information (a reference picture index) identifying a reference picture, and information identifying a motion vector are individually coded.

In the motion detection prediction mode, which of the single prediction and the bi-prediction is used is indicated by the prediction mode, and in the case of the single prediction, a vector difference between information identifying a reference picture on one reference picture and a vector predictor of a motion vector is coded. In the case of the bi-prediction, information identifying a reference picture on two reference pictures and a motion vector are individually coded. A vector predictor for a motion vector is constructed from motion information of a neighboring block, similarly to the AVC, but similarly to the coupling prediction mode, it is possible to select a motion vector used for a vector predictor from a plurality of neighboring block candidates, and a motion vector is transmitted as two of information (index) designating a neighboring block to be used for a vector predictor and a vector difference are coded.

Figure 9:
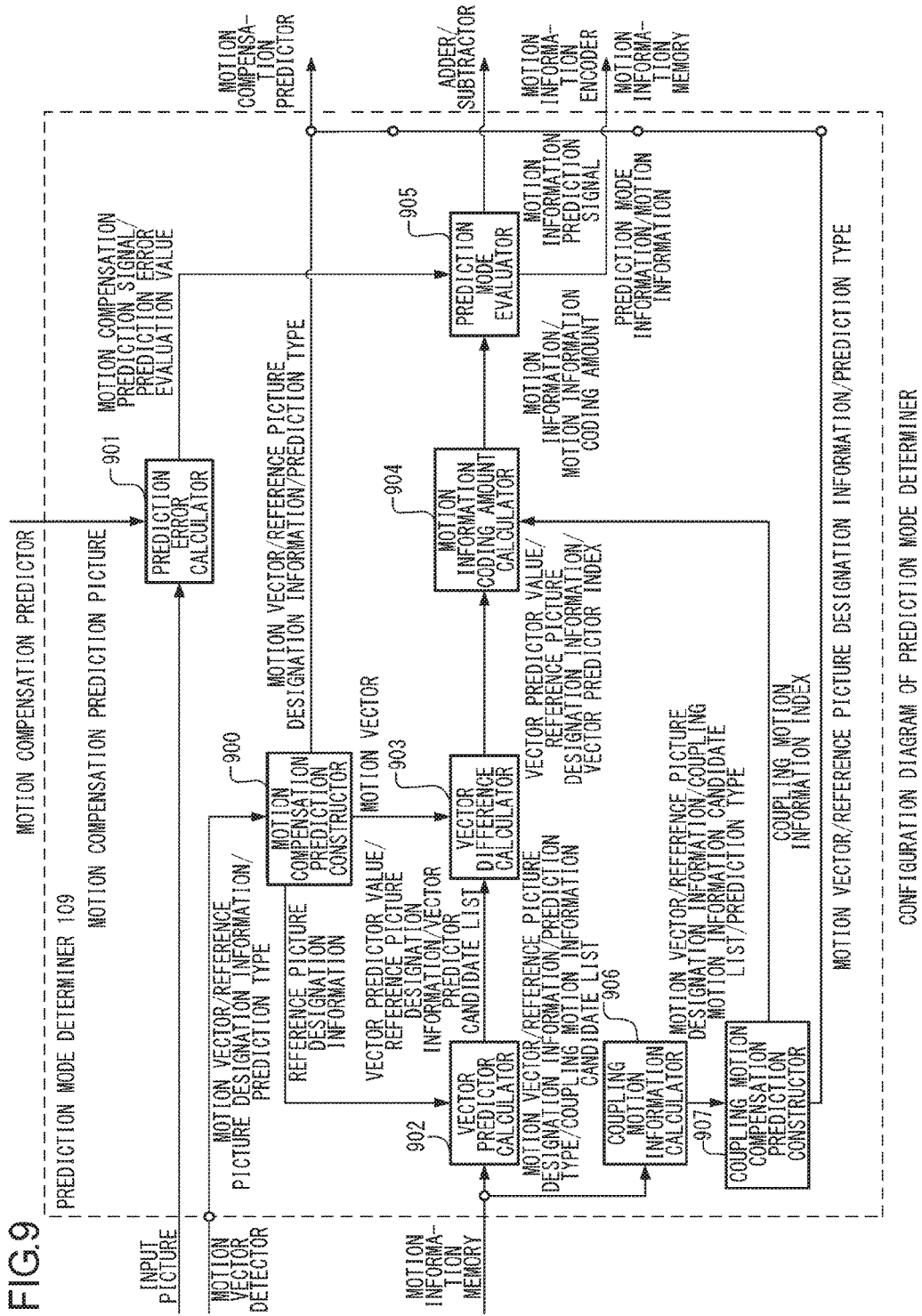
FIG. 9 is a diagram illustrating a detailed configuration of a prediction mode determiner in a moving picture coding device according to an embodiment.

Description of Detailed Operation of Prediction Mode Determiner in Moving Picture Coding Device According to the Embodiment FIG. 9 is a diagram illustrating a detailed configuration of the prediction mode determiner 109 in the moving picture coding device according to the embodiment. The prediction mode determiner 109 has a function of deciding an optimal motion compensation prediction mode.

The prediction mode determiner 109 includes a motion compensation prediction constructor 900, a prediction error calculator 901, a vector predictor calculator 902, a vector difference calculator 903, a motion information coding amount calculator 904, a prediction mode evaluator 905, a coupling motion information calculator 906, and a coupling motion compensation prediction constructor 907.

In the prediction mode determiner 109 illustrated in FIG. 1, the motion vector value input from the motion vector detector 107 is supplied to the motion compensation prediction constructor 900, and the motion information input from the motion information memory 111 is supplied to the vector predictor calculator 902 and the coupling motion information calculator 906.

Further, the prediction type, the reference picture designation information, and the motion vector that are used for the motion compensation prediction are output from the motion compensation prediction constructor 900 and the coupling motion compensation prediction constructor 907 to the motion compensation predictor 108, and the constructed motion compensation prediction picture is supplied from the motion compensation predictor 108 to the prediction error calculator 901. Further, a picture signal of a prediction block of a coding target is supplied from the input terminal 100 to the prediction error calculator 901.

Further, the prediction mode evaluator 905 supplies prediction mode information decided as motion information to be coded to the motion information encoder 110, supplies the motion information to the motion information memory 111, and supplies the motion compensation prediction signal to the subtractor 101 and the adder 105.

The motion compensation prediction constructor 900 receives the motion vector value calculated on each reference picture usable for prediction, performs the motion compensation prediction according to the bi-prediction restriction information, supplies the reference picture designation information to the vector predictor calculator 902, and outputs the reference picture designation information and the motion vector.

The prediction error calculator 901 calculates a prediction error evaluation value based on the input motion compensation prediction picture and the prediction block picture of the processing target. As a calculation for calculating the error evaluation value, an SAD of each pixel or an SSE of each pixel can be used, similarly to the error evaluation value in the motion vector detection. Further, as orthogonal transform and quantization that are performed when coding of prediction residual is performed are performed, it is possible to additionally consider an amount of distorted components occurring in a decoded picture and calculate an accurate error evaluation value. In this case, this can be implemented such that the prediction error calculator 901 has the functions of the subtractor 101, the orthogonal transformer/quantizer 102, the inverse quantizer/inverse transformer 104, and the adder 105 in FIG. 1.

The prediction error calculator 901 supplies the prediction error evaluation value calculated in each prediction mode and the motion compensation prediction signal to the prediction mode evaluator 905.

The vector predictor calculator 902 receives the reference picture designation information from the motion compensation prediction constructor 900, receives the motion vector value on the designated reference picture from a group of candidate blocks in the motion information of the neighboring block supplied from the motion information memory 111, constructs a plurality of vector predictors together with the vector predictor candidate list, and supplies the plurality of vector predictors and the vector predictor candidate list to the vector difference calculator 903 together with the reference picture designation information. The vector predictor calculator 902 constructs candidates of a vector predictor, and adds the candidate as vector predictor candidates.

The vector difference calculator 903 calculates a difference between each of the vector predictor candidates supplied from the vector predictor calculator 902 and the motion vector value supplied from the motion compensation prediction constructor 900, and calculates a vector difference value. When the calculated vector difference value and a vector predictor index serving as designation information for the vector predictor candidate are coded, a coding amount is smallest. The vector difference calculator 903 supplies the vector predictor index for the vector predictor that is the smallest information amount and the vector difference value to the motion information coding amount calculator 904 together with the reference picture designation information.

The motion information coding amount calculator 904 calculates a coding amount necessary for the motion information in each prediction mode based on the vector difference value, the reference picture designation information, and the vector predictor index supplied from the vector difference calculator 903 and the prediction mode. Further, the motion information coding amount calculator 904 receives coupling motion information index and information indicating the prediction mode that need to be transmitted in the coupling prediction mode from the coupling motion compensation prediction constructor 907, and calculates a coding amount necessary for the motion information in the coupling prediction mode.

The motion information coding amount calculator 904 supplies the motion information calculated in each prediction mode and the coding amount necessary for the motion information to the prediction mode evaluator 905.

The prediction mode evaluator 905 calculates the sum of the motion compensation the prediction error evaluation values of the respective prediction modes using the prediction error evaluation value of the respective prediction modes supplied from the prediction error calculator 901 and the motion information coding amount of the respective prediction modes supplied from the motion information coding amount calculator 904, selects a prediction mode that is smallest in the evaluation value, and outputs the selected prediction mode and the motion information for the selected prediction mode to the motion information encoder 110 and the motion information memory 111. Further, the prediction mode evaluator 905 similarly selects the prediction signal in the selected prediction mode for the motion compensation prediction signal supplied from the prediction error calculator 901, and outputs the selected prediction signal to the subtractor 101 and the adder 105.

The coupling motion information calculator 906 constructs a plurality of motion information as the motion information configured with the prediction type indicating the single prediction or the bi-prediction, the reference picture designation information, and the motion vector value together with the coupling motion information candidate list using a group of candidate blocks in the motion information of the neighboring block supplied from the motion information memory 111, and supplies the plurality of motion information and the coupling motion information candidate list to the coupling motion compensation prediction constructor 907.

Figure 10:
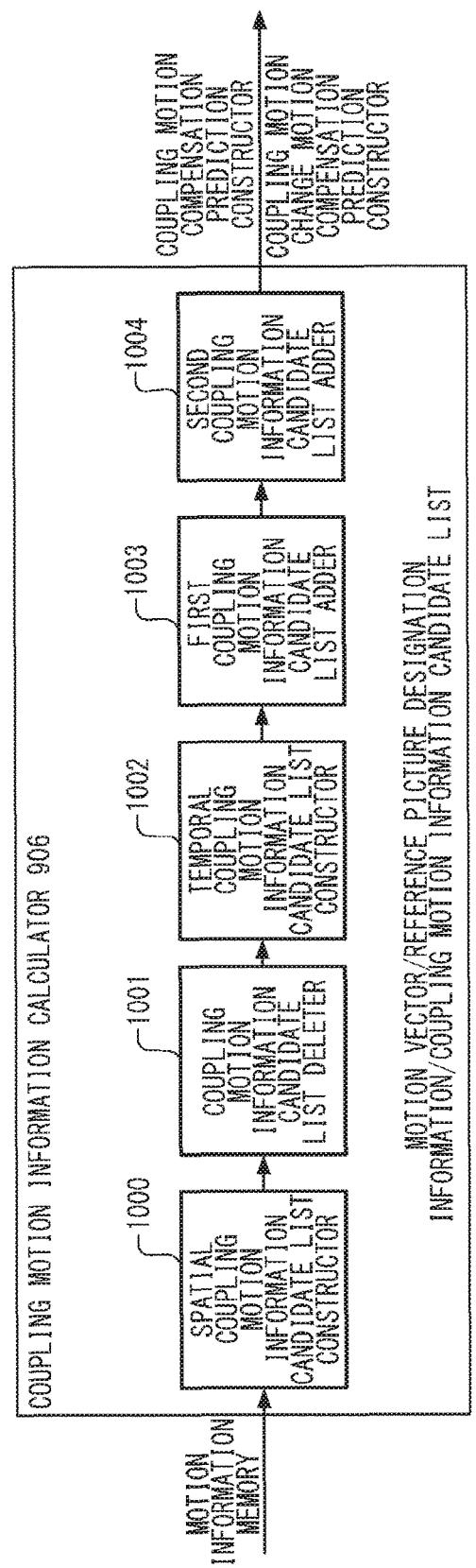
FIG. 10 is a diagram illustrating a configuration of a coupling motion information calculator of FIG. 9 according to an embodiment.

FIG. 10 is a diagram illustrating a configuration of the coupling motion information calculator 906. The coupling motion information calculator 906 includes a spatial coupling motion information candidate list constructor 1000, a coupling motion information candidate list deleter 1001, a temporal coupling motion information candidate list constructor 1002, a first coupling motion information candidate list adder 1003, and a second coupling motion information candidate list adder 1004. The coupling motion information calculator 906 adds only valid motion information as a coupling motion information candidate by creating candidates of the motion information in a certain order from a group of spatially neighboring candidate blocks, deleting candidates having the same motion information from the created candidates, and adding candidates of the motion information created from a group of temporally neighboring candidate blocks. A characteristic configuration of the present embodiment lies in that the temporal coupling motion information candidate list constructor is arranged at a stage behind the coupling motion information candidate list deleter, and as the temporal coupling motion information candidate is excluded from a target of a process of deleting the same motion information, it is possible to reduce a computation amount without lowering coding efficiency. A detailed operation of the coupling motion information calculator 906 will be described later.

Referring back to FIG. 9, the coupling motion compensation prediction constructor 907 designates the reference picture designation information of one reference picture (the single prediction) and two reference pictures (the bi-prediction) and motion vector values to the motion compensation predictor 108 according to the prediction type from the motion information for each of the added coupling motion information candidates from the coupling motion information candidate list supplied from the coupling motion information calculator 906, constructs the motion compensation prediction picture, and supplies each coupling motion information index to the motion information coding amount calculator 904.

In the present embodiment, there are cases in which the motion compensation prediction is performed using the reference picture designation information different from the reference picture designation information supplied from the coupling motion information calculator 906. In other words, the motion compensation predictor 108 changes the prediction type based on the prediction type, the reference picture designation information, the motion vector value, and the bi-prediction restriction information, and performs the motion compensation prediction. The details of the motion compensation prediction performed in the prediction type different from the supplied prediction type will be described later.

In the configuration of FIG. 9, prediction mode evaluation in each coupling motion information index is performed by the prediction mode evaluator 905, but a configuration of receiving the prediction error evaluation value and the motion information coding amount from the prediction error calculator 901 and the motion information coding amount calculator 904, causing the coupling motion compensation prediction constructor 907 to evaluate a coupling motion index of optimal coupling motion compensation prediction, and then evaluating an optimal prediction mode including another prediction mode may be provided.

Figure 11:
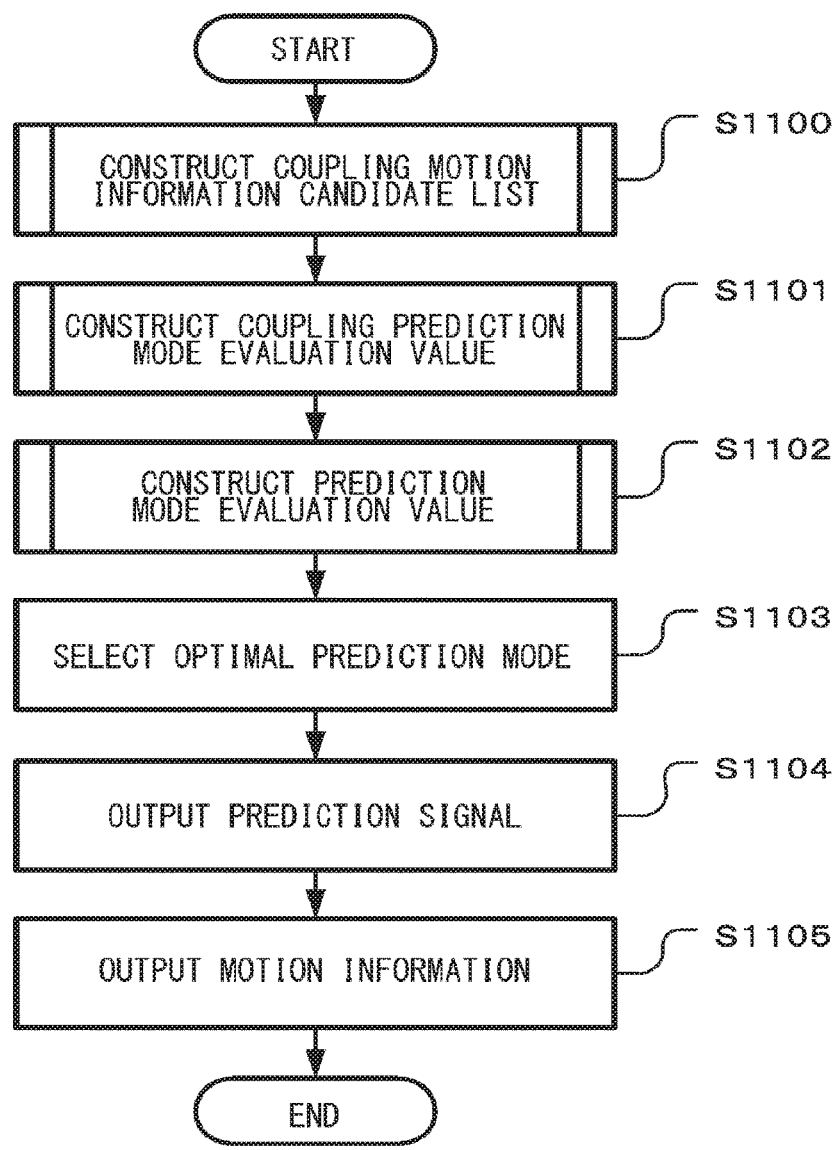
FIG. 11 is a flowchart for describing a detailed operation of a motion compensation prediction mode/prediction signal construction process of step S502 of FIG. 5.

FIG. 11 is a flowchart for describing a detailed operation of the motion compensation prediction mode/prediction signal construction process of step S502 of FIG. 5. This operation is a detailed operation in the prediction mode determiner 109 of FIG. 9.

First, a coupling motion information candidate list is constructed (S1100), and a coupling prediction mode evaluation value is constructed (S1101). Then, a prediction mode evaluation value is constructed (S1102), and an optimal prediction mode is selected by comparing the constructed evaluation values (S1103). Here, the evaluation value construction order of steps S1101 and S1102 is not limited to this example.

A prediction signal is output according to the selected prediction mode (S1104), motion information is output according to the selected prediction mode (S1105), and then the motion compensation prediction mode/prediction signal construction process performed in units of prediction blocks ends. The detailed operation of steps S1100, S1101, and S1102 will be described later.

Figure 12:
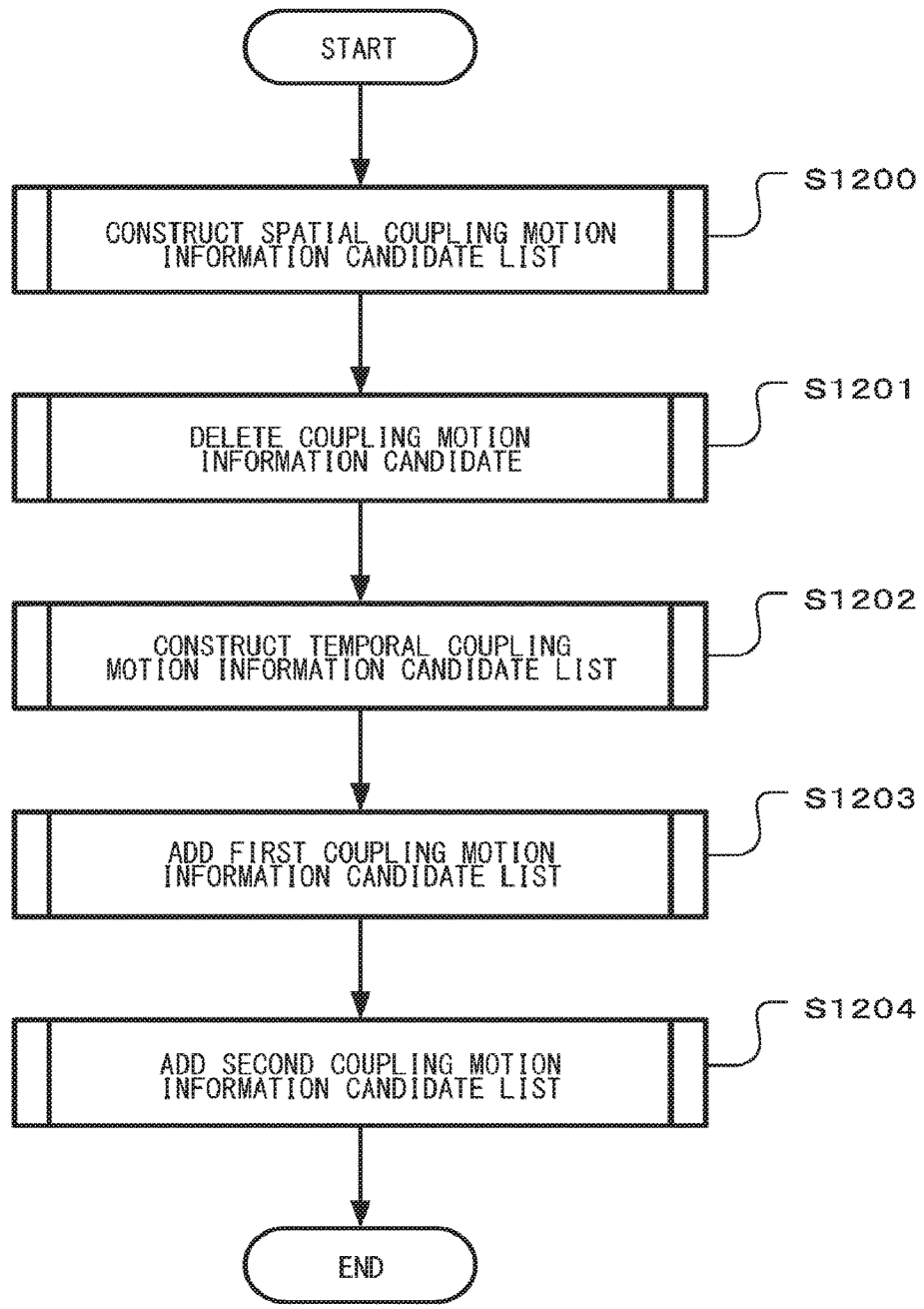
FIG. 12 is a flowchart for describing a detailed operation of coupling motion information candidate list construction of FIG. 11 according to an embodiment.

FIG. 12 is a flowchart for describing a detailed operation of the coupling motion information candidate list construction of step S1100 of FIG. 11. This operation is a detailed operation of the configuration in the coupling motion information calculator 906 of FIG. 9.

The spatial coupling motion information candidate list constructor 1000 of FIG. 10 constructs a spatial coupling motion information candidate list from a candidate block obtained by excluding a candidate block that is outside a region or a candidate block corresponding to the intra mode from a spatial candidate block group supplied from the motion information memory 111 (S1200). The detailed operation of the spatial coupling motion information candidate list construction will be described later.

Then, the coupling motion information candidate list deleter 1001 deletes the coupling motion information candidates having the same motion information from the constructed spatial coupling motion information candidate list, and updates the motion information candidate list (S1201). A detailed operation of the coupling motion information candidate construction will be described later.

Then, the temporal coupling motion information candidate list constructor 1002 constructs the temporal coupling motion information candidate list from a candidate block obtained by excluding a candidate block that is outside a region or a candidate block corresponding to the intra mode from a temporal candidate block group supplied from the motion information memory 111 (S1202), and couples it with the temporal coupling motion information candidate list to construct the coupling motion information candidate list. A detailed operation of the temporal coupling motion information candidate list construction will be described later.

Then, the first coupling motion information candidate list adder 1003 constructs 0 to 2 first coupling motion information candidates from the coupling motion information candidates added to the coupling motion information candidate list constructed by the temporal coupling motion information candidate list constructor 1002, adds the constructed first coupling motion information candidates to the coupling motion information candidate list (S1203), and supplies the coupling motion information candidate list to the second coupling motion information candidate list adder 1004. A detailed operation of the first coupling motion information candidates list addition will be described later.

Then, the second coupling motion information candidate list adder 1004 constructs 0 to 4 second coupling motion information candidates that do not depend on the coupling motion information candidate list supplied from the first coupling motion information candidate list adder 1003, and adds the second coupling motion information candidates to the coupling motion information candidate list supplied from the first coupling motion information candidate list adder 1003 (S1204), and then the process ends. A detailed operation of the second coupling motion information candidate list addition will be described later.

A group of candidate blocks of the motion information supplied from the motion information memory 111 to the coupling motion information calculator 906 includes a spatial candidate block group and a temporal candidate block group. First, the spatial coupling motion information candidate list construction will be described.

Figure 13:
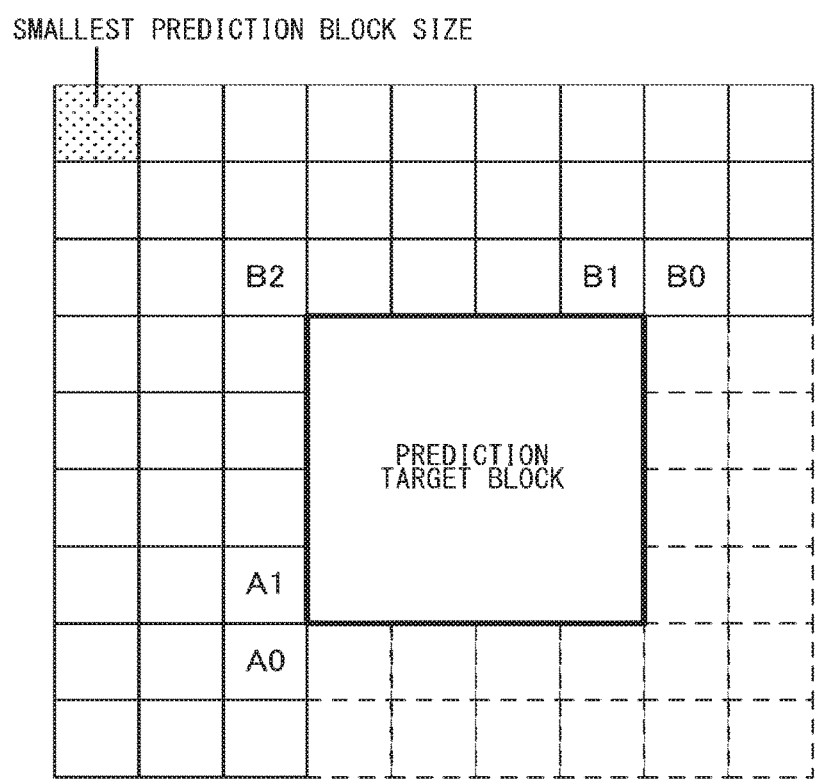
FIG. 13 is a diagram illustrating a spatial candidate block group used for spatial coupling motion information candidate list construction.

FIG. 13 is a diagram illustrating a spatial candidate block group used for the spatial coupling motion information candidate list construction. A spatial candidate block group refers to blocks of the same picture neighboring a prediction target block of a coding target picture. A block group is managed in smallest prediction block size units, and a position of a candidate block is managed in smallest prediction block size units, but when the prediction block size of the neighboring block is larger than the smallest prediction block size, the same motion information is stored in all the candidate blocks of the prediction block size. In the embodiment, 5 blocks of a block A0, a block A1, a block B0, a block B1, and a block B2 illustrated in FIG. 13 among neighboring blocks are assumed to be a spatial candidate block group.

Figure 14:
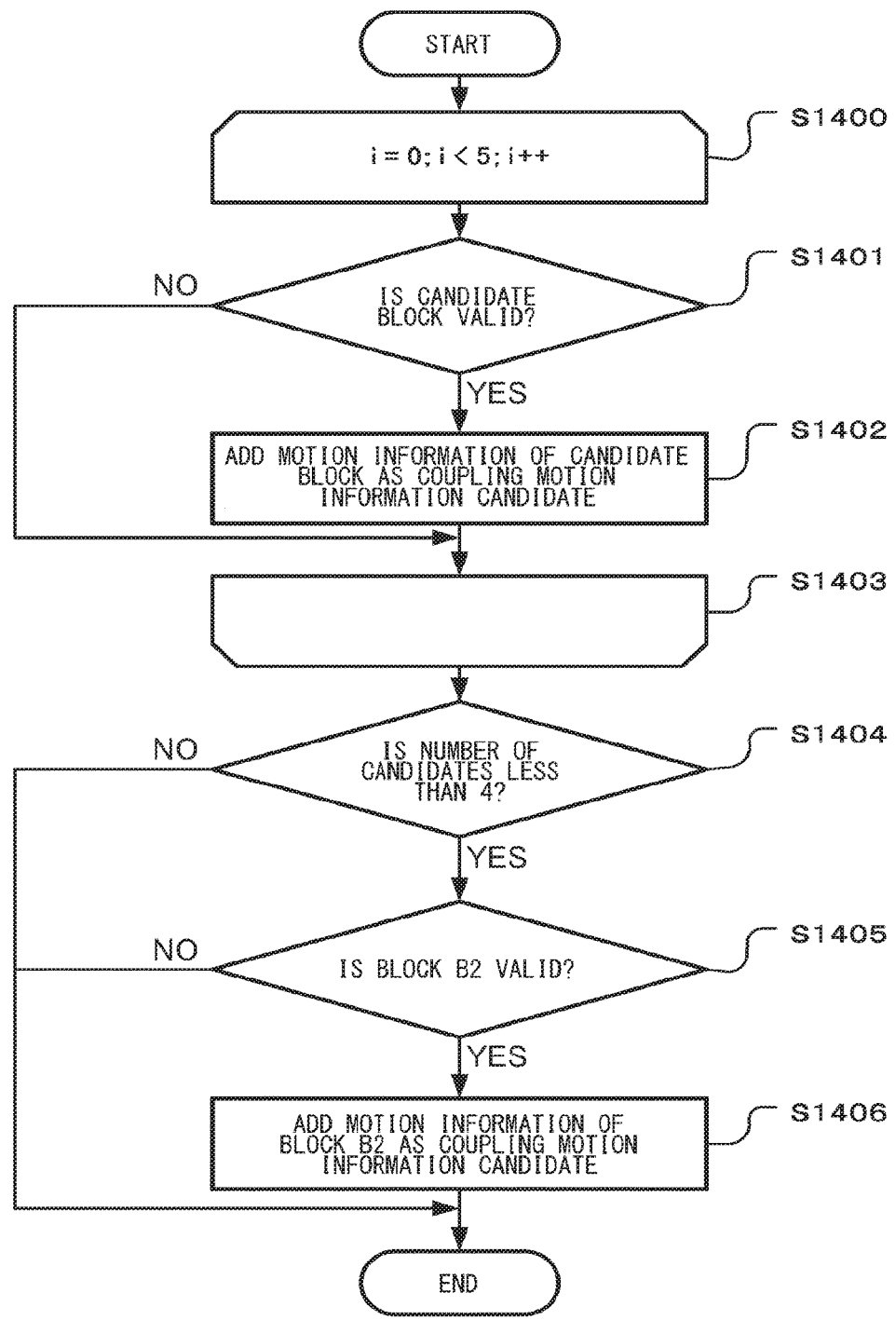
FIG. 14 is a flowchart for describing a detailed operation of spatial coupling motion information candidate list construction.

FIG. 14 is a flowchart for describing a detailed operation of the spatial coupling motion information candidate list construction. The following process is repeatedly performed on the block A0, the block A1, the block B0, the block B1, and the block B2 among the 5 candidate blocks included in the spatial candidate block group in the order of the block A1, the block B1, the block B0, and the block A0 (S1400 to S1403).

First, validity of a candidate block is inspected (S1401). When the candidate block is not outside the region and corresponds to the intra mode, the candidate block is valid. When the candidate block is valid (YES in S1401), the motion information of the candidate block is added to the spatial coupling motion information candidate list (S1402).

After the process of steps S1400 to S1403 is repeatedly performed, when the number of candidates added to the spatial coupling motion information candidate list is less than 4 (YES in S1404), validity of the candidate block B2 is inspected (S1405). When the block B2 is not outside the region and does not correspond to the intra mode (YES in S1405), the motion information of the block B2 is added to the spatial coupling motion information candidate list (S1406).

Here, the spatial coupling motion information candidate list includes motion information smaller than or equal to 4 candidate blocks, but preferably, the spatial candidate block group includes at least larger than or equal to one processed blocks neighboring a prediction block of a processing target, and the number of spatial coupling motion information candidate lists is changed, and the present invention is not limited to this example.

Figure 15:
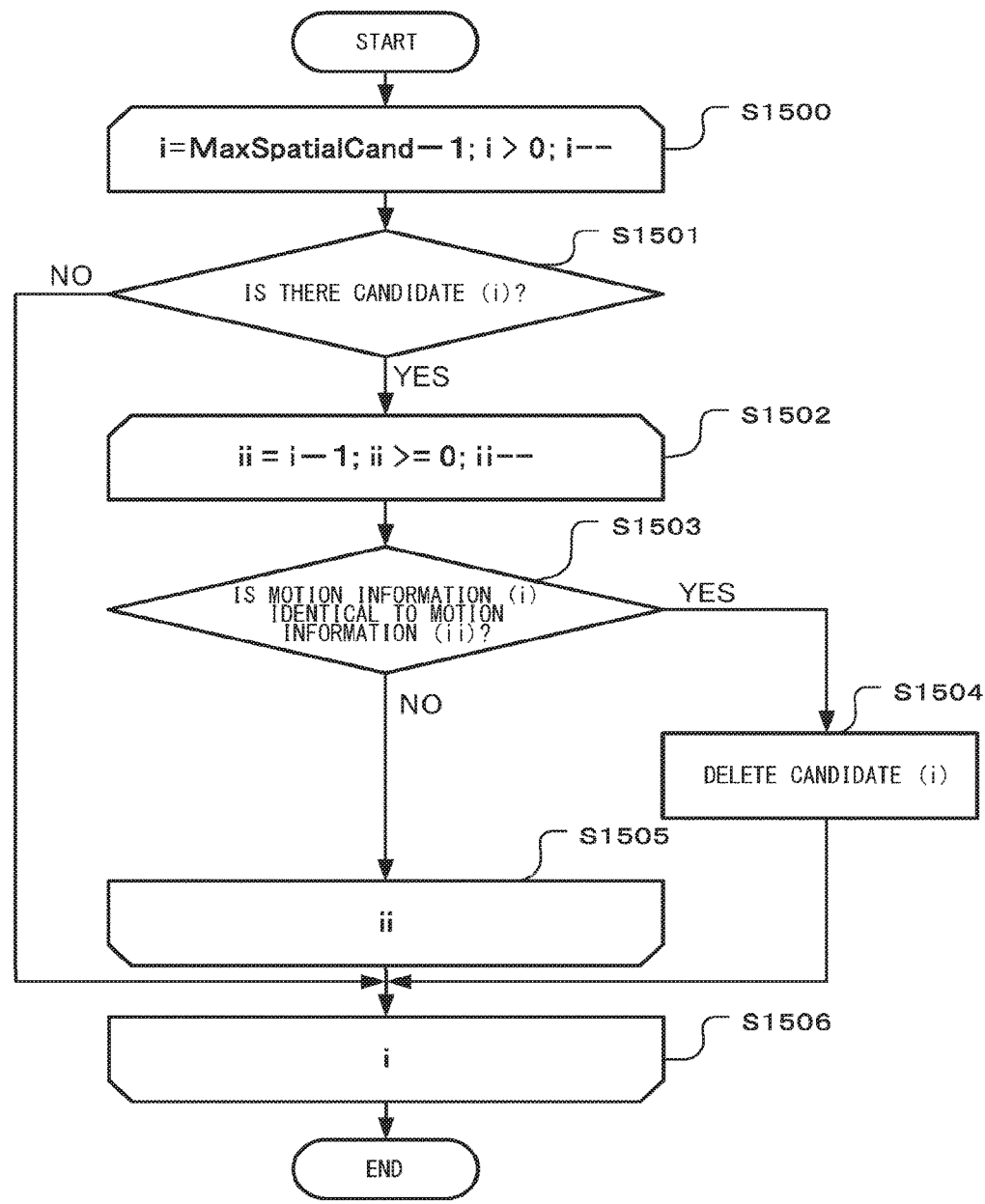
FIG. 15 is a flowchart for describing of a detailed operation of coupling motion information candidate deletion according to an embodiment.

FIG. 15 is a flowchart for describing a detailed operation of the coupling motion information candidate deletion. When MaxSpatialCand indicates a maximum of the number of coupling motion information candidates constructed through the spatial coupling motion information candidate list construction process, the following process is repeatedly perform on a coupling motion information candidate (candidate (i)) from i=MaxSpatialCand−1 to i>0 (S1500 to S1506).

When there is a candidate (i) (YES in S1501), the following process is repeatedly perform on a coupling motion information candidate (candidate (ii)) from ii=i−1 to ii>=0 (S1502 to S1505), and when there is no candidate (i) (NO in S1501), the repetition process on the candidate (ii) from step S1502 to step S1505 is skipped.

First, it is inspected whether motion information (motion information (i)) of the candidate (i) is identical to motion information (motion information (ii)) of the candidate (ii) (S1503), and when the motion information (motion information (i)) of the candidate (i) is identical to the motion information (motion information (ii)) of the candidate (ii) (YES in S1503), the candidate (i) is deleted from the coupling motion information candidate list (S1504), the repetition process on the candidate (ii) ends.

When the motion information (i) is not identical to the motion information (ii) (NO in S1503), 1 is subtracted from ii, and the process on the candidate (ii) is repeated (S1502 to S1505).

After the repetition process of steps S1500 to S1505, 1 is subtracted from i, the process on the candidate (i) is repeated (S1500 to S1506).

Figure 16:
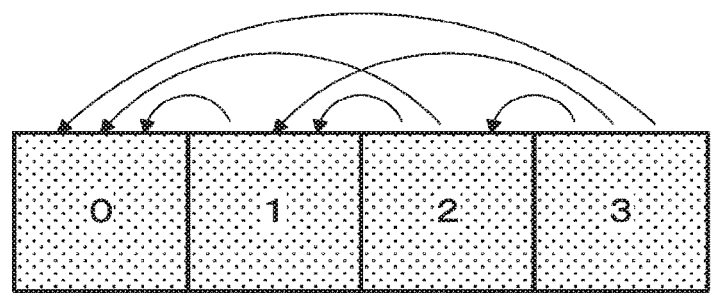
FIG. 16 is a diagram illustrating a comparative relation of a motion information candidate in coupling motion information candidate deletion according to an embodiment.

FIG. 16 illustrates a comparative relation of candidates in a list when there are 4 coupling motion information candidates. In other words, identity determination is performed by comparing 4 spatial the coupling motion information candidates not including the temporal coupling motion information candidate in the round-robin manner, and a redundant candidate is deleted.

Here, the coupling prediction mode is a technique of not coding motion information of a prediction target block directly but using motion information of a spatially or temporally neighboring block for coding using continuity of motion in the temporal direction or the spatial direction, but the spatial coupling motion information candidate is based on continuity in the spatial direction, whereas the temporal coupling motion information candidate is constructed by a technique that will be described later based on continuity in the temporal direction, and such natures are different. Thus, the temporal coupling motion information candidate hardly includes the same motion information as the spatial coupling motion information candidate, and even when the temporal coupling motion information candidate is excluded from a target of the coupling motion information candidate deletion process for deleting the same motion information, the same motion information is hardly included in a finally obtained coupling motion information candidate list.

Further, as will be described later, since the temporal coupling motion information candidate block is managed in units of smallest temporal prediction blocks having a size larger than the smallest prediction block, when a temporally neighboring prediction block is smaller in size than the smallest temporal prediction block, motion information of a position deviated from an original position is used, and thus there are many cases in which motion information includes an error. Thus, motion information different from the motion information of the spatial coupling motion information candidate is often obtained, and even when it is excluded from the target of the coupling motion information candidate deletion process for deleting the same motion information, there is little influence.

FIGS. 17A and 17B illustrate exemplary candidate comparison content in the coupling motion information candidate deletion when a maximum of the number of spatial coupling motion information candidates is 4. FIG. 17A illustrates comparison content when only the spatial coupling motion information candidate is the target of the coupling motion information candidate deletion process, and FIG. 17B illustrates comparison content when both the spatial coupling motion information candidate and the temporal coupling motion information candidate are the target of the process. As only the spatial coupling motion information candidate is the target of the coupling motion information candidate deletion process, the number of motion information comparisons is decreased from 10 times to 6 times.

As described above, as the temporal coupling motion information candidate is not the target of the coupling motion information candidate deletion process, it is possible to reduce the number of motion information comparisons from 10 times to 6 times while appropriately deleting the same motion information.

Further, it is possible to reduce the number of coupling motion information candidate deletion processes by comparing candidates that are located to be spatially close to one another without comparing all spatial prediction candidates for identity determination. Specifically, it is possible to limit the number of motion information comparisons to a maximum of 5 times such that coupling motion information calculated from a B1 position of FIG. 13 is compared with coupling motion information of an A1 position, coupling motion information calculated from a B0 position is compared only with coupling motion information of the B1 position, coupling motion information calculated from an A0 position is compared only with A1, and coupling motion information calculated from a B2 position is compared only with A1 and B1.

In the case in which the identity of the coupling motion information is determined by a comparison only with a specific spatial prediction candidate as described above, when the coupling motion information candidate reduction process (S1201) is performed during the spatial coupling motion information candidate list construction (S1200), there is small influence of a decrease in coding efficiency caused as the same coupling motion information remains. In other words, it is because as the identity of the coupling motion information is determined when the spatial coupling motion information candidate list is constructed, an unnecessary coupling motion information need not be added, and thus when a maximum of the number of spatial prediction candidates is limited to 4 in step S1404 of FIG. 14, a possibility that coupling motion information calculated from a B2 position will be added increases.

Then, the temporal coupling motion information candidate list construction will be described. FIGS. 18A and 18B are diagrams for describing a definition of a temporal direction neighboring prediction block used for the temporal coupling motion information candidate list construction. A temporal candidate block group indicates blocks that are at the same position as or in the neighborhood of a prediction target block among blocks belonging to a decoded picture ColPic different from a picture to which the prediction target block belongs. A block group is managed in smallest temporal prediction block size units, and a position of a candidate block is managed in smallest temporal prediction block size units. In the embodiment of the present invention, the smallest temporal prediction block size is as twice large as the smallest prediction block size in the vertical direction and the horizontal direction. When the prediction block size of the temporally neighboring block is larger than the smallest temporal prediction block size, the same motion information is stored in all candidate blocks of the prediction block sizes. However, when the prediction block size is smaller than the smallest temporal prediction block size, motion information of a prediction block positioned at the upper left of the temporal direction neighboring prediction block is regarded as information of the temporal direction neighboring prediction block. FIG. 18B illustrates the motion information of the temporal direction neighboring prediction block when the prediction block size is smaller than the smallest temporal prediction block size.

In FIG. 18A, blocks at positions A1 to A4, B1 to B4, C, D, E, F1 to F4, G1 to G4, H, and 11 to 116 are assumed to be a temporally neighboring block group. In the embodiment, 2 blocks of the block H and the block 16 are assumed to be a temporal candidate block group in the temporally neighboring block group.

FIG. 19 is a flowchart for describing a detailed operation of the temporal coupling motion information candidate list construction. For the block H and the block III that are two candidate blocks included in the temporal candidate block group (S1800 and S1805), the validity of the candidate block is inspected in the order of the block H and the block III (S1801). When the candidate blocks are valid (YES in S1801), the process of steps S1802 to S1804 is performed, the constructed motion information is added to the temporal coupling motion information candidate list, and then the process ends. When the candidate block indicates a position outside a screen region or when the candidate block is an intra prediction block (NO in S1801), the candidate block is invalid, and validity determination of a next candidate block is performed.

When the candidate block is valid (YES in S1801), a reference picture selection candidate to be added as the coupling motion information candidate is decided based on the motion information of the candidate block (S1802). In the embodiment, a reference picture of L0 prediction is regarded as a reference picture at a position closest to a processing target picture among reference pictures of L0 prediction, and a reference picture of L1 prediction is regarded as a reference picture at a position closest to a processing target picture among reference pictures of L1 prediction.

Here, as a technique of deciding the reference picture selection candidate, a technique capable of deciding the reference picture of L0 prediction and the reference picture of L1 prediction is desirable, and the present invention is not limited to this example. As the reference picture is decided using the same technique in the coding process and the decoding process, a desired reference picture can be decided at the time of coding. As another decision technique, for example, a technique of selecting a reference picture in which reference picture indices of the reference picture of L0 prediction and the reference picture of L1 prediction are 0, a technique of selecting an L0 reference picture and an L1 reference picture in which a spatial neighboring block is being used, or a technique of designating a reference picture of each prediction type in a bitstream may be used.

Then, the motion vector value to be added as the coupling motion information candidate is decided based on the motion information of the candidate block (S1803). In the embodiment, for the temporal coupling motion information, motion information of the bi-prediction is calculated based on a motion vector value that is motion information of the candidate block and a valid prediction type. When the prediction type of the candidate block is the single prediction of L0 prediction or L1 prediction, the motion information of the prediction type (L0 prediction or L1 prediction) being used in prediction is selected, and the reference picture designation information and the motion vector value thereof are selected as a reference value for the bi-prediction motion information construction.

When the prediction type of the candidate block is the bi-prediction, motion information of either of L0 prediction and L1 prediction is selected as a reference value. As a technique of selecting a reference value, for example, there are a technique of selecting motion information depending on the same prediction type as ColPic, a technique of selecting one of reference pictures of L0 prediction and L1 prediction of the candidate block that is small in an inter-picture distance with ColPic, and a technique of selecting it at a coding side and explicitly transmitting it through syntax.

When the motion vector value used as the reference for the bi-prediction motion information construction is decided, a motion vector value to be added to the coupling motion information candidate is calculated.

Figure 20:
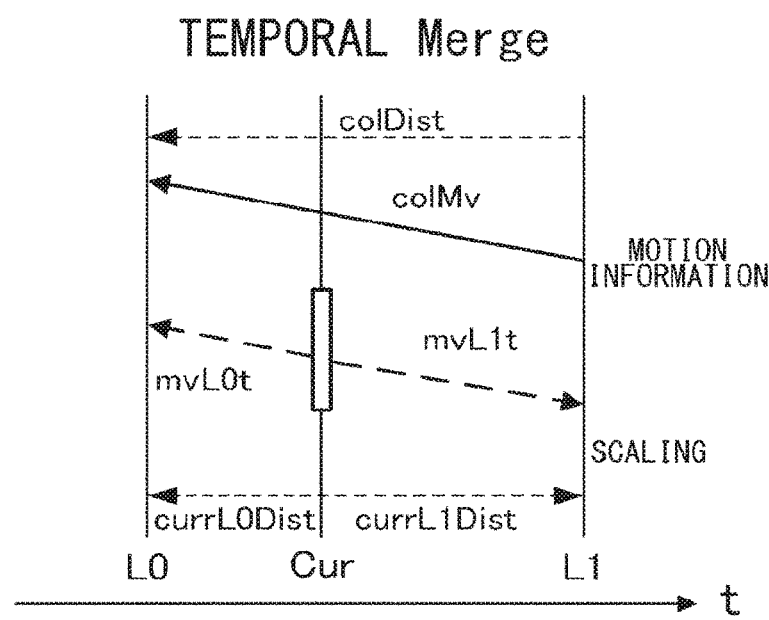
FIG. 20 is a diagram for describing a technique of calculating motion vector values mvL0t and mvL1t to be added for L0 prediction and L1 prediction with respect to a reference motion vector value ColMv for temporal coupling motion information.

FIG. 20 is a diagram for describing a technique of calculating motion vector values mvL0t and mvL1t to be added for L0 prediction and L1 prediction with respect to a reference motion vector value ColMv for the temporal coupling motion information.

An inter-picture distance between ColPic for the reference motion vector value ColMv and a reference picture serving as a motion vector target used as a reference of a candidate block is assumed to be ColDist. Inter-picture distances between the reference pictures of L0 prediction and L1 prediction and a processing target picture are assumed to be CurrL0Dist and CurrL1Dist. Motion vectors obtained by scaling ColMv at distance ratios of ColDist and CurrL0Dist and CurrL1Dist are assumed to be motion vectors to be added. Specifically, the motion vector values mvL0t and mvL1t to be added are calculated by the following Equations 1 and 2:

$$mvL0t = mvCol \times CurrL0Dist/ColDist \quad \text{(Equation 1)}$$

$$mvL1t = mvCol \times CurrL1Dist/ColDist \quad \text{(Equation 2)}$$

Referring back to FIG. 19, the reference picture selection information (index) of the bi-prediction constructed as described above and the motion vector value are added as the coupling motion information candidate (S1804), and the temporal coupling motion information candidate list construction process ends.

Figure 21:
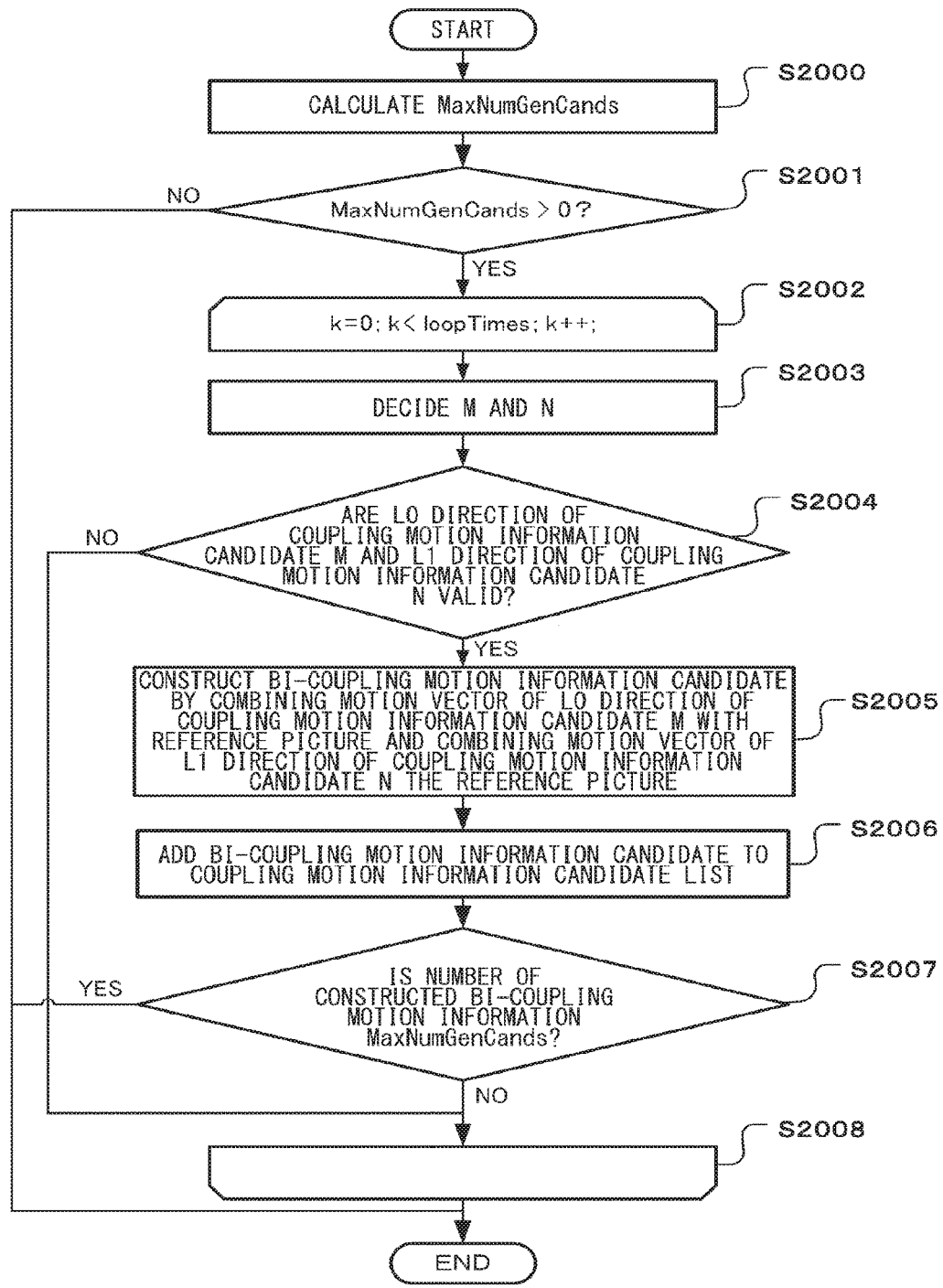
FIG. 21 is a flowchart for describing a detailed operation of a first coupling motion information candidate list adder.

Then, a detailed operation of the first coupling motion information candidate list adder 1003 will be described. FIG. 21 is a flowchart for describing an operation of the first coupling motion information candidate list adder 1003. First, MaxNumGenCand that is a maximum of the number of first addition coupling motion information candidates to be constructed is calculated by Equation 3 based on the number (NumCandList) of coupling motion information candidates added to the coupling motion information candidate list supplied from the temporal coupling motion information candidate list constructor 1002 and a maximum (MaxNumMergeCand) of the number of coupling motion information candidates (S2000).

MaxNumGenCand=MaxNumMergeCand−NumCandList;

(NumCandList>1)

MaxNumGenCand=0;(NumCandList<=1)　　(Equation 3)

Then, it is inspected whether or not MaxNumGenCand is larger than 0 (S2001). When MaxNumGenCand is not larger than 0 (NO in S2001), the process ends. When MaxNumGenCand is larger than 0 (YES in S2001), the following process is performed. First, loopTimes indicating the number of combination inspections is decided. NumCandList.times.NumCandList is set as loopTimes. Here, when loopTimes exceeds 8, loopTimes is limited to 8 (S2002). Here, loopTimes is an integer of 0 to 7. The following process is repeated by loopTimes (S2002 to S2008).

A combination of a coupling motion information candidate M and a coupling motion information candidate N is decided (S2003). Here, a relation among the number of combination inspections, the coupling motion information candidate M, and the coupling motion information candidate N is now described.

FIG. 22 is a diagram for describing a relation among the number of combination inspections, the coupling motion information candidate M, and the coupling motion information candidate N. As illustrated in FIG. 22, M and N are different values, and M is first fixed to 0, a value of N is changed from 1 to 4 (a maximum value is NumCandList), then a value of N is fixed to 0, and a value of M is changed from 1 to 4 (a maximum value is NumCandList). Such a combination definition has an effect capable of calculating a combination pattern by a calculation without a combination table practically while effectively using initial motion information in a coupling motion information candidate list that is motion information that is highest in selection probability.

It is inspected whether or not L0 prediction of the coupling motion information candidate M and L1 prediction of the coupling motion information candidate N are valid (S2004). When L0 prediction of the coupling motion information candidate M and L1 prediction of the coupling motion information candidate N are valid (YES in S2004), a bi-coupling motion information candidate is constructed by combining the motion vector of L0 prediction of the coupling motion information candidate M with the reference picture and combining the motion vector of L1 prediction of the coupling motion information candidate N with the reference picture (S2005). When L0 prediction of the coupling motion information candidate M is valid but L1 prediction of the coupling motion information candidate N is invalid (NO in S2004), a next combination is processed. Here, there are cases in which the motion information of L0 prediction is identical to L1 prediction in the first addition coupling motion information candidate, and even when motion compensation is performed in the bi-prediction, the same result as the single prediction of L0 prediction or L1 prediction is obtained, and thus construction of an addition coupling motion information candidate in which the motion information of L0 prediction is identical to the motion information of L1 prediction causes a motion compensation prediction computation amount to increase. Thus, commonly, it is checked whether the motion information of L0 prediction is identical to the motion information of L1 prediction, and only when the motion information of L0 prediction is not identical to the motion information of L1 prediction, it is used as the first addition coupling motion information candidate. However, in the present embodiment, a process of collectively converting the bi-prediction into the single prediction is performed through a motion compensation predictor which will be described later, and thus it is unnecessary to determine whether or not the motion information of L0 prediction is identical to the motion information of L1 prediction through the first addition coupling motion information candidate list adder, and thus a computation amount can be reduced. After step S2005, the bi-coupling motion information candidate is added to the coupling motion information candidate list (S2006). After step S2006, it is inspected whether or not the number of constructed bi-coupling motion information is MaxNumGenCand (S2007). When the number of constructed bi-coupling motion information is MaxNumGenCand (YES in S2007), the process ends. However, when the number of constructed bi-coupling motion information is not MaxNumGenCand (NO in S2007), a next combination is processed.

Here, in the first addition coupling motion information candidate, when there is a slight difference between the motion information of the coupling motion information candidate added to the coupling motion information candidate list and the motion information of the motion information candidate of the processing target, the coding efficiency can be increased by revising the motion information of the coupling motion information candidate added to the coupling motion information candidate list and constructing the valid coupling motion information candidate.

Figure 23:
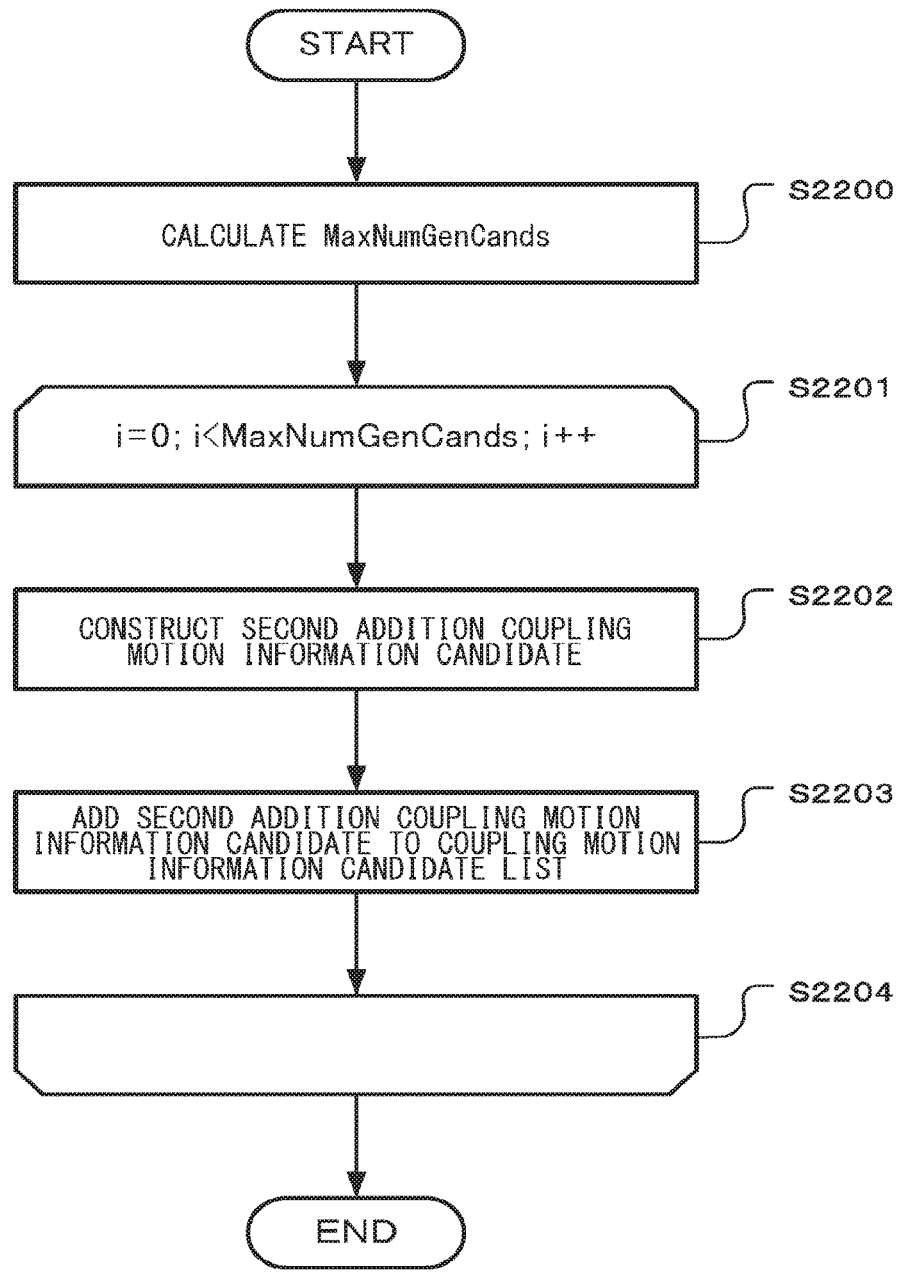
FIG. 23 is a flowchart for describing a detailed operation of a second coupling motion information candidate list adder.

Next, a detailed operation of the second coupling motion information candidate list adder 1004 will be described. FIG. 23 is a flowchart for describing an operation of the second coupling motion information candidate list adder 1004. First, MaxNumGenCand that is a maximum of the number of first addition coupling motion information candidates to be constructed is calculated by Equation 4 based on the number (NumCandList) of coupling motion information candidates added to the coupling motion information candidate list supplied from the first coupling motion information candidate list adder 1003 and a maximum (MaxNumMergeCand) of the number of coupling motion information candidates (S2200).

MaxNumGenCand=MaxNumMergeCand−NumCandList;　　(Equation 4)

Then, the following process is repeatedly performed by MaxNumGenCand for i (S2201 to S2205). Here, i is an integer from 0 to MaxNumGenCand−1. A second addition coupling motion information candidate in which the motion vector of L0 prediction is (0,0), a reference index is i, the motion vector of L1 prediction is (0,0), the prediction type in which the reference index is i is the bi-prediction is constructed (S2202). The second addition coupling motion information candidate is added to the coupling motion information candidate list (S2203). The process is performed for a next i (S2204).

Here, the coupling motion information candidate in which the motion vector of L0 prediction is (0,0), the reference index is i, the motion vector of L1 prediction is (0,0), and the prediction type in which the reference index is i is the bi-prediction is used as the second addition coupling motion information candidate. It is because in a common moving picture, the frequency of occurrence of the coupling motion information candidate in which the motion vector of L0 prediction and the motion vector of L1 prediction are (0,0) is statistically high. The present invention is not limited to this example unless a coupling motion information candidate that does not depend on the motion information of the coupling motion information candidate added to the coupling motion information candidate list and is statistically high in frequency of use is used. For example, the motion vector of L0 prediction or L1 prediction may be a vector value other than (0,0), and the reference indices of L0 prediction and L1 prediction may be set to be different. Further, motion information that is high in frequency of occurrence in a coded picture or a part of a coded picture may be used as the second addition coupling motion information candidate, coded into a bitstream, transmitted, and set. Here, a B picture (B slice) has been described but in the case of a P picture (P slice), a second addition coupling motion information candidate in which the motion vector of L0 prediction is (0,0) and the prediction type is L0 prediction is constructed.

Here, there are cases in which the reference picture of L0 prediction is identical to the reference picture of L1 prediction in the second addition coupling motion information candidate, and similarly to the first addition coupling motion information candidate list constructor, even when motion compensation is performed in the bi-prediction, the same result as the single prediction of L0 prediction or L1 prediction is obtained, and thus construction of an addition coupling motion information candidate in which the reference picture of L0 prediction is identical to the reference picture of L1 prediction causes a motion compensation prediction computation amount to increase. However, in the present embodiment, a process of collectively converting the bi-prediction into the single prediction is performed through a motion compensation predictor which will be described later, and thus it is unnecessary to determine whether or not the motion information of L0 prediction is identical to the motion information of L1 prediction through the second addition coupling motion information candidate list adder, and thus a computation amount can be reduced.

Here, as the coupling motion information candidate that does not depend on the coupling motion information candidate added to the coupling motion information candidate list is set as the second addition coupling motion information candidate, when no coupling motion information candidate is added to the coupling motion information candidate list, it is possible to use the coupling prediction mode, and thus it is possible to improve the coding efficiency. Further, when the motion information of the coupling motion information candidate added to the coupling motion information candidate list is different from the motion information of the motion information candidate of the processing target, it is possible to improve the coding efficiency by constructing a new coupling motion information candidate and increasing a range of choice.

Figure 24:
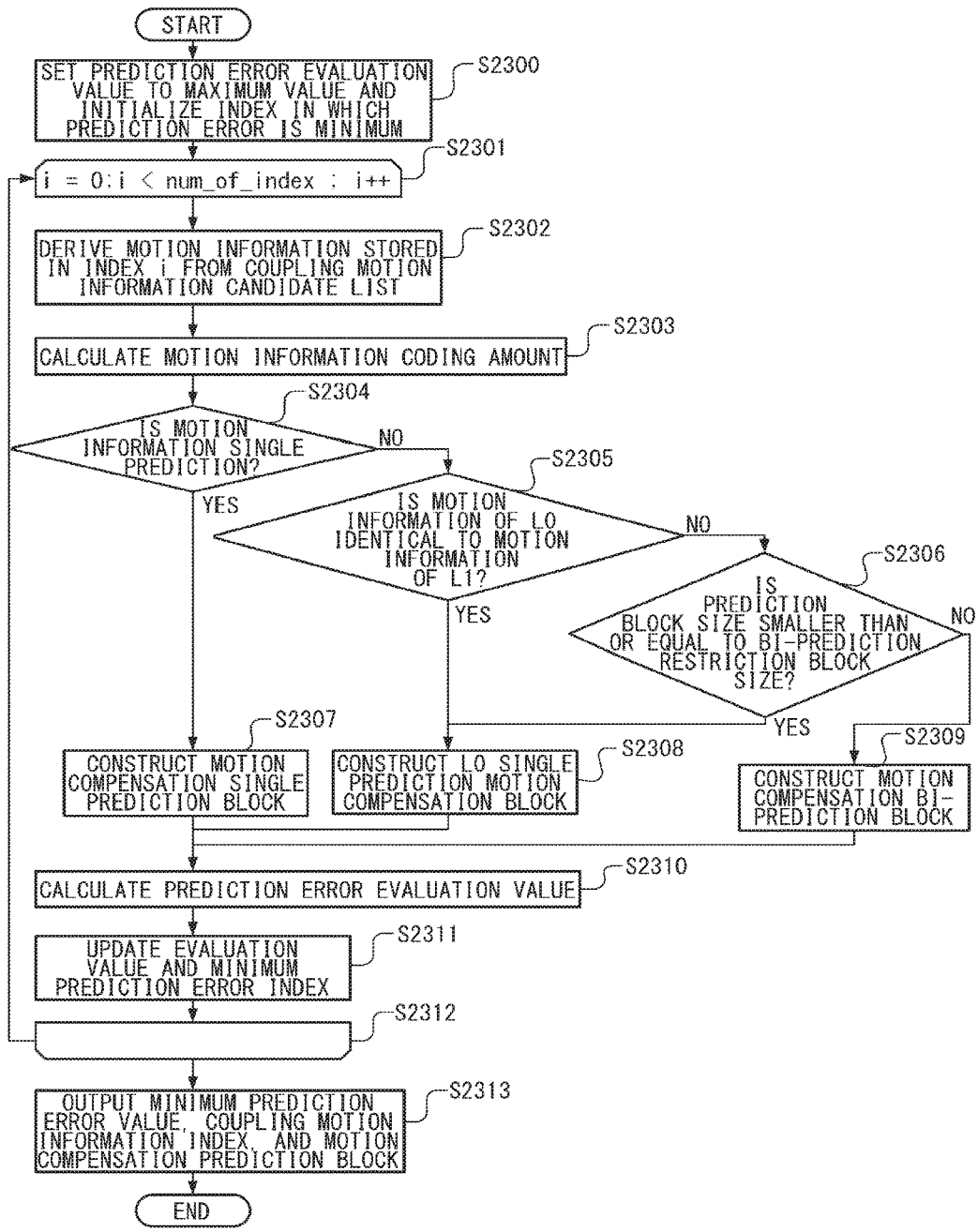
FIG. 24 is a flowchart for describing a detailed operation of a coupling prediction mode evaluation value construction process of FIG. 11.

FIG. 24 is a flowchart for describing a detailed operation of the coupling prediction mode evaluation value construction process of step S1101 of FIG. 11. This operation is a detailed operation of a configuration using the coupling motion compensation prediction constructor 907 of FIG. 9.

First, the prediction error evaluation value is set to a maximum value, and the coupling motion information index in which the prediction error is minimum is initialized (for example, a value outside a list such as −1) (S2300). When the number of coupling motion information candidate lists constructed through the coupling motion information candidate list construction process is assumed to be num_of_index, the following process is repeatedly performed on the coupling motion information candidate where i is 0 to num_of_index−1 (S2301 to S2313).

First, the motion information stored in an index i is derived from the coupling motion information candidate list (S2302). Then, the motion information coding amount is calculated (S2303). In the coupling prediction mode, since only the coupling motion information index is coded, only the coupling motion information index becomes the motion information coding amount.

As a bitstream of the coupling motion information index, in the embodiment, a Truncated Unary bitstream is used. FIG. 25 is a diagram illustrating a Truncated Unary bitstream when the number of coupling motion information candidates is 5. When the value of the coupling motion information index is coded using the Truncated Unary bitstream, as the coupling motion information index decreases, a code bit allocated to the coupling motion information index decreases. For example, in the case in which the number of coupling motion information candidates is 5, when the coupling motion information index is 1, it is expressed by 2 bits of "10", but when the coupling motion information index is 3, it is expressed by 4 bits of "1110." Here, the Truncated Unary bitstream is used for coding of the coupling motion information index as described above, but any other bitstream construction technique can be used, and the bitstream construction technique is not limited to this example.

Then, when the prediction type of the motion information is the single prediction (YES in S2304), the motion compensation predictor 108 constructs a motion compensation the single prediction block using the reference picture designation information and the motion vector for one reference picture (S2307).

When the motion information is the single prediction, that is, when the motion information is the bi-prediction (NO in S2304), the motion compensation predictor 108 determines whether or not the motion information of L0 prediction is identical to the motion information (the reference picture information and the motion vector) of L1 prediction, and performs L0 single prediction motion compensation prediction using the motion information of L0 prediction (S2308) when the motion information of L0 prediction is identical to the motion information of L1 prediction (YES in S2305). Here, when the motion information of the bi-prediction is maintained, and the motion information of L1 prediction does not change.

When the motion information of L0 prediction is not identical to the motion information of L1 prediction (NO in S2305), it is determined whether or not the prediction block size is smaller than or equal to a bi-prediction restriction size. When the prediction block size is smaller than or equal to the bi-prediction restriction block size (YES in S2306), L0 single prediction motion compensation prediction is performed using only the motion information of L0 prediction (S2308), similarly to when the motion information of L0 prediction is identical to the motion information of L1 prediction (YES in S2305). Here, the motion information of the bi-prediction is maintained, and the motion information of L1 prediction does not change. The bi-prediction restriction aims to restrict the bi-prediction to the single prediction and suppress a motion compensation prediction memory band, and thus the prediction list (L0/L1) restricted by the bi-prediction restriction may be set to L1 single prediction.

Here, the bi-prediction restriction block size is set to a block size less than 8.times.8. Here, the threshold value is not limited to 8.times.8, and as long as the threshold value is between the largest prediction block size and the smallest prediction block size, the bi-prediction restriction block size may be set to another value and may be set to a block smaller than or equal to 8.times.8, including an 8.times.8 block. The bi-prediction restriction block size may be explicitly transmitted from a coding side to the decoding side through syntax in a bitstream. Further, in order to reduce a coding amount of syntax related to the bi-prediction restriction, the coding side may transmit a flag indicating whether or not the bi-prediction restriction is performed in a certain block size (for example, 8.times.8), and the decoding side may determine whether or not the bi-prediction restriction is performed in a certain block size.

When the prediction block size is neither smaller than nor equal to the bi-prediction restriction block size (NO in S2306), the motion compensation predictor 108 constructs a motion compensation bi-prediction block using the reference picture designation information and the motion vector for two reference pictures (S2306).

Then, the prediction error evaluation value is calculated based on the prediction error and the motion information coding amount of the motion compensation prediction block and the prediction target block (S2310), and when the prediction error evaluation value is a minimum value, the evaluation value is updated, and a minimum prediction error index is updated (S2311).

Figure 33:
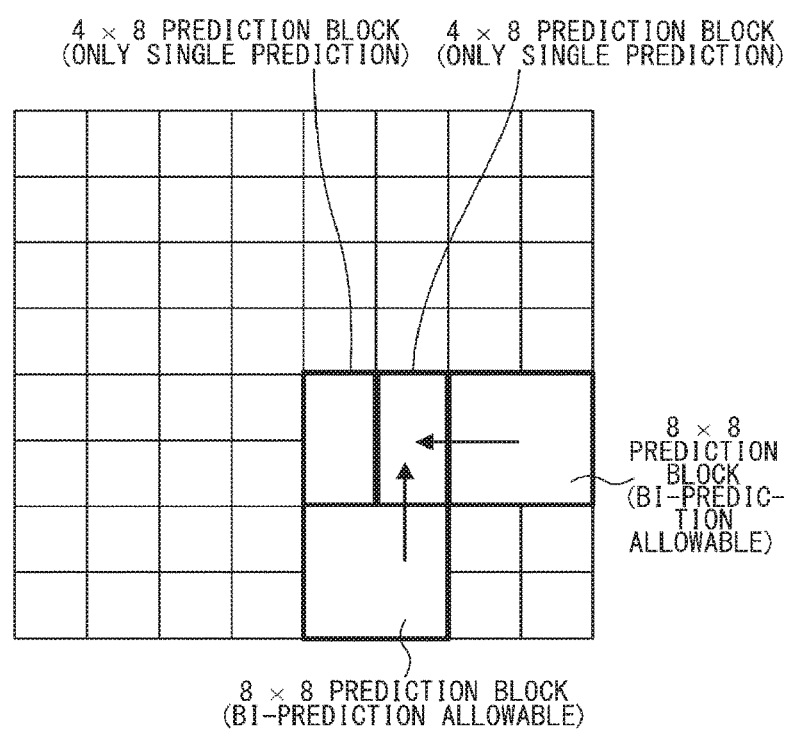
FIG. 33 is a diagram for describing motion information prediction of bi-prediction from a prediction block to which bi-prediction restriction is applied.

As described above, in each process in the coupling motion prediction candidate construction, a condition determination as to whether or not it is smaller than or equal to a certain prediction block size is not added, and the motion compensation prediction is collectively performed in the single prediction in an L0 direction when the prediction type of the prediction block smaller than or equal to the certain prediction block size is the bi-prediction at the time of the motion compensation prediction after the motion information decision, and thus it is possible to suppress the motion compensation prediction memory band by minimum conditional branching addition. Further, the coupling motion information candidate in which the prediction signal is for the single prediction, and the motion information is for the bi-prediction can be maintained. Thus, as illustrated in FIG. 33, even when the prediction block has the size smaller than or equal to a certain prediction block size, the motion information is stored based on L0 prediction or L1 prediction, and thus information of the bi-prediction can be used as neighboring reference motion information of a prediction block to be subsequently coded or decoded without change, and prediction efficiency of the motion prediction process of a prediction block to be subsequently coded or decoded can be improved. Further, in scalable coding of increasing spatial resolution of a picture, the motion information of the bi-prediction can be used even as motion information when an enhancement layer is predicted from a base layer. Furthermore, when the bi-prediction restriction is specified as a coding/decoding standard, in decoding decided by a standard, only L0 prediction information is used at the time of the motion compensation prediction, but the image quality can be improved by performing the motion compensation prediction using the motion information of the bi-prediction without following the decoding standard. Particularly, in picture decoding in which a decoded picture is not used as a reference picture, even when the bi-prediction is performed on a prediction block to which the bi-prediction restriction is applied, it is possible to normally decode without affecting motion compensation prediction of a picture to be subsequently decoded, and thus it is more effective.

Referring back to the flowchart of FIG. 24, as a result of comparing the prediction error evaluation values of all the coupling motion information candidates, the selected minimum prediction error index is output as the coupling motion information index used in the coupling prediction mode together with the minimum prediction error value and the motion compensation prediction block (S2312), and the coupling prediction mode evaluation value construction process ends.

Figure 26:
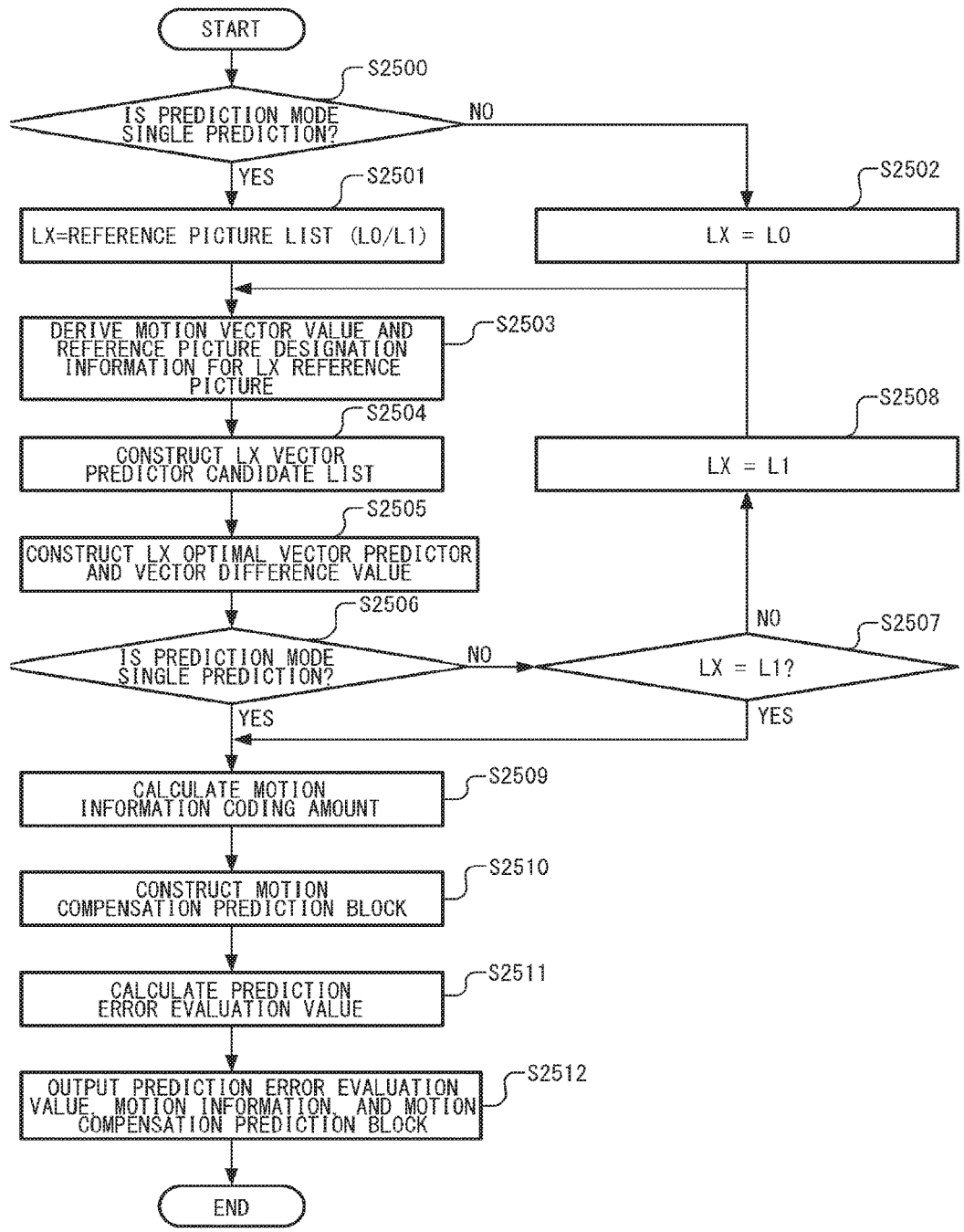
FIG. 26 is a flowchart for describing a detailed operation of a prediction mode evaluation value construction process of FIG. 11.

FIG. 26 is a flowchart for describing a detailed operation of the prediction mode evaluation value construction process of step S1102 of FIG. 11.

First, it is determined whether or not the prediction mode is the single prediction (S2500). Here, when the prediction block size is smaller than or equal to the bi-prediction restriction block size, since L0 single prediction is implicitly performed, it is unnecessary to determine whether or not the prediction mode is the single prediction (S2500).

FIG. 32 illustrates syntax related to the motion information of the prediction block. In FIG. 32, merge_flag indicates whether or not the prediction mode is the coupling prediction mode, and when merge_flag=0, it indicates the motion detection prediction mode. In the case of the B slice for which the bi-prediction can be used when the prediction mode is the motion detection prediction mode, flaginter_pred_flag indicating whether or not the prediction type is the single prediction or the bi-prediction is transmitted. Here, even when the prediction block size is smaller than or equal to the bi-prediction restriction block size, inter_pred_flag is transmitted without prohibiting the bi-prediction. In other words, when the prediction type is the bi-prediction and the motion information is transmitted, the motion information of L0 and L1 is transmitted, but the motion compensation prediction is performed through L0 single prediction. It is to prevent the process from being complicated since conditional branching is necessary for entropy coding/decoding if it is switched whether or not inter_pred_flag is transmitted according to whether or not the prediction block size is smaller than or equal to the bi-prediction restriction block size. Further, as illustrated in FIG. 33, even when the prediction block has the size smaller than or equal to a certain prediction block size, the motion information is stored based on L0 prediction or L1 prediction, and thus information of the bi-prediction can be used as neighboring reference motion information of a prediction block to be subsequently coded or decoded without change, and prediction efficiency of the motion prediction process of a prediction block to be subsequently coded or decoded can be improved. Further, in scalable coding of increasing spatial resolution of a picture, the motion information of the bi-prediction can be used even as motion information when an enhancement layer is predicted from a base layer. Furthermore, when the bi-prediction restriction is specified as a coding/decoding standard, in decoding decided by a standard, only L0 prediction information is used at the time of the motion compensation prediction, but the image quality can be improved by performing the motion compensation prediction using the motion information of the bi-prediction without following the decoding standard. Particularly, in picture decoding in which a decoded picture is not used as a reference picture, even when the bi-prediction is performed on a prediction block to which the bi-prediction restriction is applied, it is possible to normally decode without affecting motion compensation prediction of a picture to be subsequently decoded, and thus it is more effective.

When the prediction mode is the single prediction, a reference picture list used for prediction is set as a reference picture list (LX) of a processing target (S2501). However, when the prediction mode is not the single prediction, the bi-prediction is performed, and thus in this case, L0 is set as LX (S2502).

Referring back to the flowchart of FIG. 26, then, the reference picture designation information (index) and the motion vector value for LX prediction are derived (S2503). Then, the vector predictor candidate list is constructed (S2504), an optimal vector predictor is selected from among vector predictors, and a vector difference is constructed (S2505). As a technique of selecting the optimal vector predictor, a technique of selecting a vector predictor that is smallest in a coding amount for coding a vector difference between a vector predictor and a motion vector to be transmitted is desirable, but a simple calculation may be performed, for example, by a technique of selecting a vector predictor that is smallest in the sum of absolute values of horizontal and vertical components of the vector difference.

Then, it is determined whether or not the prediction mode is the single prediction again (S2506), and when the prediction mode is the single prediction, the process proceeds to step S2509. However, when the prediction mode is not the single prediction, that is, the prediction mode is the bi-prediction, it is determined whether or not the reference list LX of the processing target is L1 (S2507). When the reference list LX is L1, the process proceeds to step S2509, but when the reference list LX is not L1, that is, when the reference list LX is L0, L1 is set as LX (S2508), and the same process as the process of steps S2503 to S2506 is performed.

Then, the motion information coding amount is calculated (S2509). The motion information to be coded includes 4 elements including the prediction type and the reference picture designation information, the vector difference value, and the vector predictor index for one reference picture in the case of the single prediction mode, and includes a total of 7 elements including the prediction type and the reference picture designation information, the vector difference value, and the vector predictor index for two reference pictures of L0 and L1 in the case of the bi-prediction mode, and a total coded coding amount is calculated as the motion information coding amount. In the present embodiment, as a technique of constructing a bitstream of the vector predictor index, the Truncated Unary bitstream is assumed to be used, similarly to the bitstream of the coupling motion information index.

Then, the motion compensation predictor 108 of FIG. 1 constructs the motion compensation prediction block using the reference picture designation information and the motion vector for the reference picture (S2510). Here, even in the motion detection prediction mode, similarly to the operation in the coupling prediction mode, for the prediction block to which is smaller than or equal to the bi-prediction restriction of the certain block size is applied, the motion compensation prediction is performed through L0 single prediction although the prediction type of the motion information is the bi-prediction.

Further, the prediction error evaluation value is calculated based on the prediction error and the motion information coding amount of the motion compensation prediction block and the prediction target block (S2511), and the prediction error evaluation value, the prediction type, and the reference picture designation information, the vector difference value, and the vector predictor index which are the motion information for the reference picture are output together with the motion compensation prediction block (S2512), and the prediction mode evaluation value construction process ends.

The above process is the detailed operation of the prediction mode determiner 109 in the moving picture coding device according to the embodiment.

Figure 27:
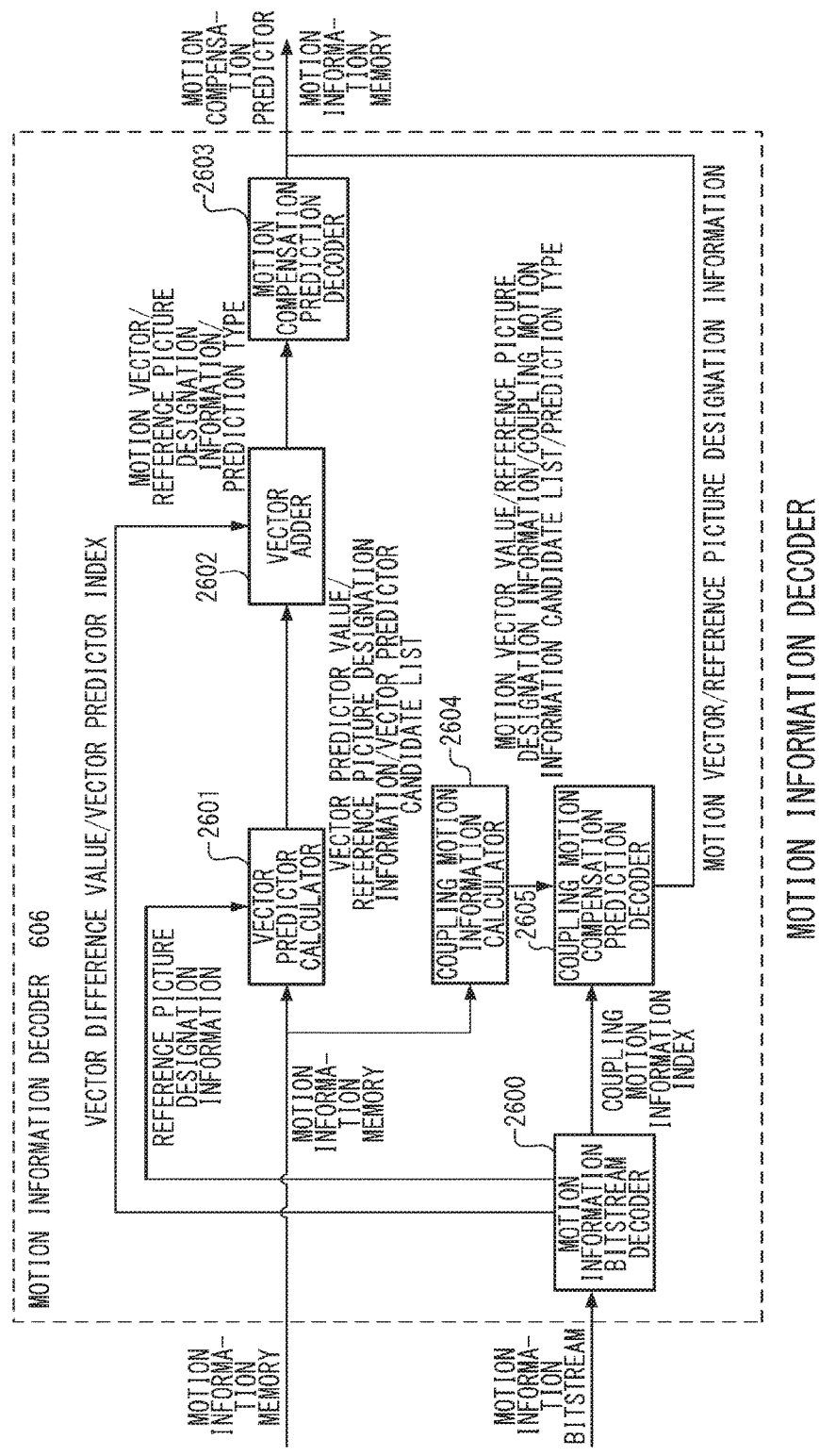
FIG. 27 is a diagram illustrating a detailed configuration of a motion information decoder in a moving picture decoding device according to an embodiment.

Description of Detailed Operation of Motion Information Decoder in Moving Picture Decoding Device According to the Embodiment FIG. 27 is a diagram illustrating a detailed configuration of the motion information decoder 606 in the moving picture decoding device of FIG. 6 according to the embodiment. The motion information decoder 606 includes a motion information bitstream decoder 2600, a vector predictor calculator 2601, a vector adder 2602, a motion compensation prediction decoder 2603, a coupling motion information calculator 2604, and a coupling motion compensation prediction decoder 2605.

In the motion information decoder 606 illustrated in FIG. 6, the motion information bitstream input from the demultiplexer 601 is supplied to the motion information bitstream decoder 2600, and the motion information input from the motion information memory 607 is supplied to the vector predictor calculator 2601 and the coupling motion information calculator 2604.

Further, the prediction type, the reference picture designation information, and the motion vector used for the motion compensation prediction are output from the motion compensation prediction decoder 2603 and the coupling motion compensation prediction decoder 2605 to the motion compensation predictor 608, and the decoded motion information is stored in the motion information memory 607.

The motion information bitstream decoder 2600 decodes the motion information bitstream input from the demultiplexer 601 according to a coding syntax, and constructs the transmitted prediction mode and the motion information according to the prediction mode. In the constructed motion information, the coupling motion information index is supplied to the coupling motion compensation prediction decoder 2605, the reference picture designation information is supplied to the vector predictor calculator 2601, the vector predictor index is supplied to the vector adder 2602, and the vector difference value is supplied to the vector adder 2602.

The vector predictor calculator 2601 constructs the vector predictor candidate list for the reference picture serving as the motion compensation prediction target based on the motion information of the neighboring block supplied from the motion information memory 607 and the reference picture designation information supplied from the motion information bitstream decoder 2600, and supplies the constructed vector predictor candidate list to the vector adder 2602 together with the reference picture designation information. The vector predictor calculator 2601 performs an operation similarly to the vector predictor calculator 902 of FIG. 9 in the moving picture coding device to construct the same candidate list as the vector predictor candidate list at the time of coding.

The vector adder 2602 adds the vector predictor value added to the position indicated by the vector predictor index to the vector difference value based on the vector predictor candidate list and the reference picture designation information supplied from the vector predictor calculator 2601 and the vector predictor index and vector difference supplied from the motion information bitstream decoder 2600, and reproduces the motion vector value for the reference picture serving as the motion compensation prediction target. The reproduced motion vector value is supplied to the motion compensation prediction decoder 2603 together with the reference picture designation information and the prediction type.

The motion compensation prediction decoder 2603 receives the reproduced motion vector value, the reference picture designation information, and the prediction type for the reference picture from the vector adder 2602, sets the motion vector value, the reference picture designation information, and the prediction type to the motion compensation predictor 608, and constructs the motion compensation prediction signal.

The coupling motion information calculator 2604 constructs the coupling motion information candidate list based on the motion information of the neighboring block supplied from the motion information memory 607, and supplies the coupling motion information candidate list and the prediction type, the reference picture designation information, and the motion vector value of the coupling motion information candidate which are elements in the list to the coupling motion compensation prediction decoder 2605.

The coupling motion information calculator 2604 performs an operation similarly to the coupling motion information calculator 906 of FIG. 9 in the moving picture coding device, and constructs the same candidate list as the coupling motion information candidate list at the time of coding.

The coupling motion compensation prediction decoder 2605 reproduces the prediction type, the reference picture designation information, and the motion vector value in the coupling motion information candidate list indicated by the coupling motion information index based on the coupling motion information candidate list and the reference picture designation information and the motion vector value of the coupling motion information candidate that are elements in the list, which are supplied from the coupling motion information calculator 2604 and the coupling motion information index supplied from the motion information bitstream decoder 2600, sets the prediction type, the reference picture designation information, and the motion vector value to the motion compensation predictor 608, and constructs the motion compensation prediction signal.

Figure 28:
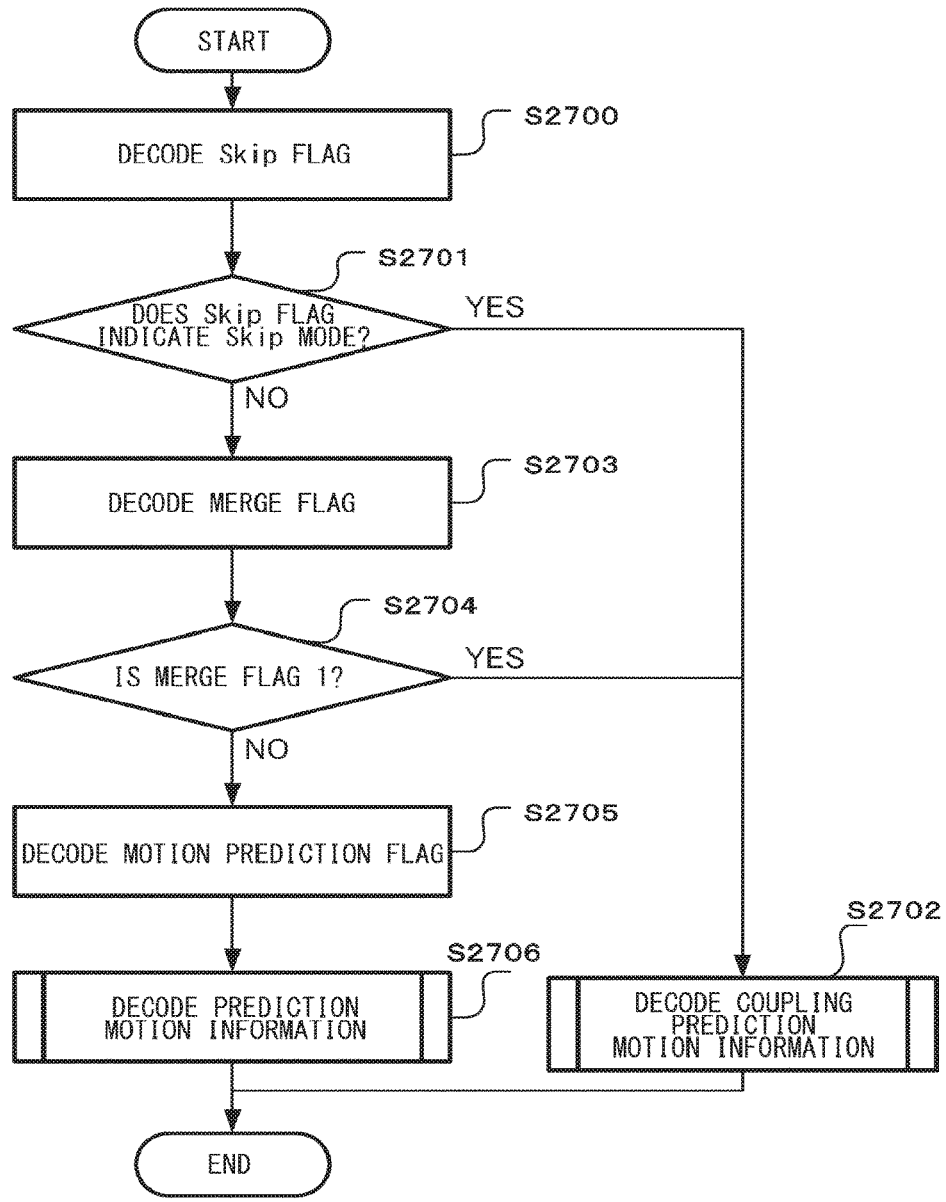
FIG. 28 is a flowchart for describing a detailed operation of a motion information decoding process of FIG. 7.

FIG. 28 is a flowchart for describing a detailed operation of the motion information decoding process of step S701 of FIG. 7. The motion information decoding process of step S701 of FIG. 7 is performed through the motion information bitstream decoder 2600, the vector predictor calculator 2601, and the coupling motion information calculator 2604.

The motion information decoding process is a process of decoding the motion information from the bitstream coded with a specific syntax structure. First, Skip flag is decoded in certain units of coding blocks (S2700). Hereinafter, the process is performed in units of prediction blocks.

When Skip flag indicates the skip mode (YES in S2701), coupling prediction motion information decoding is performed (S2702). The detailed process of step S2702 will be described later.

When Skip flag does not indicate the skip mode (NO in S2701), a merge flag is decoded (S2703). When the merge flag indicates 1 (YES in S2704), the process proceeds to the coupling prediction motion information decoding of step S2702.

When the merge flag does not indicate 1 (NO in S2704), a motion prediction flag is decoded (S2705), and prediction motion information decoding is performed (S2706). The detailed operation of step S2706 will be described later.

Figure 29:
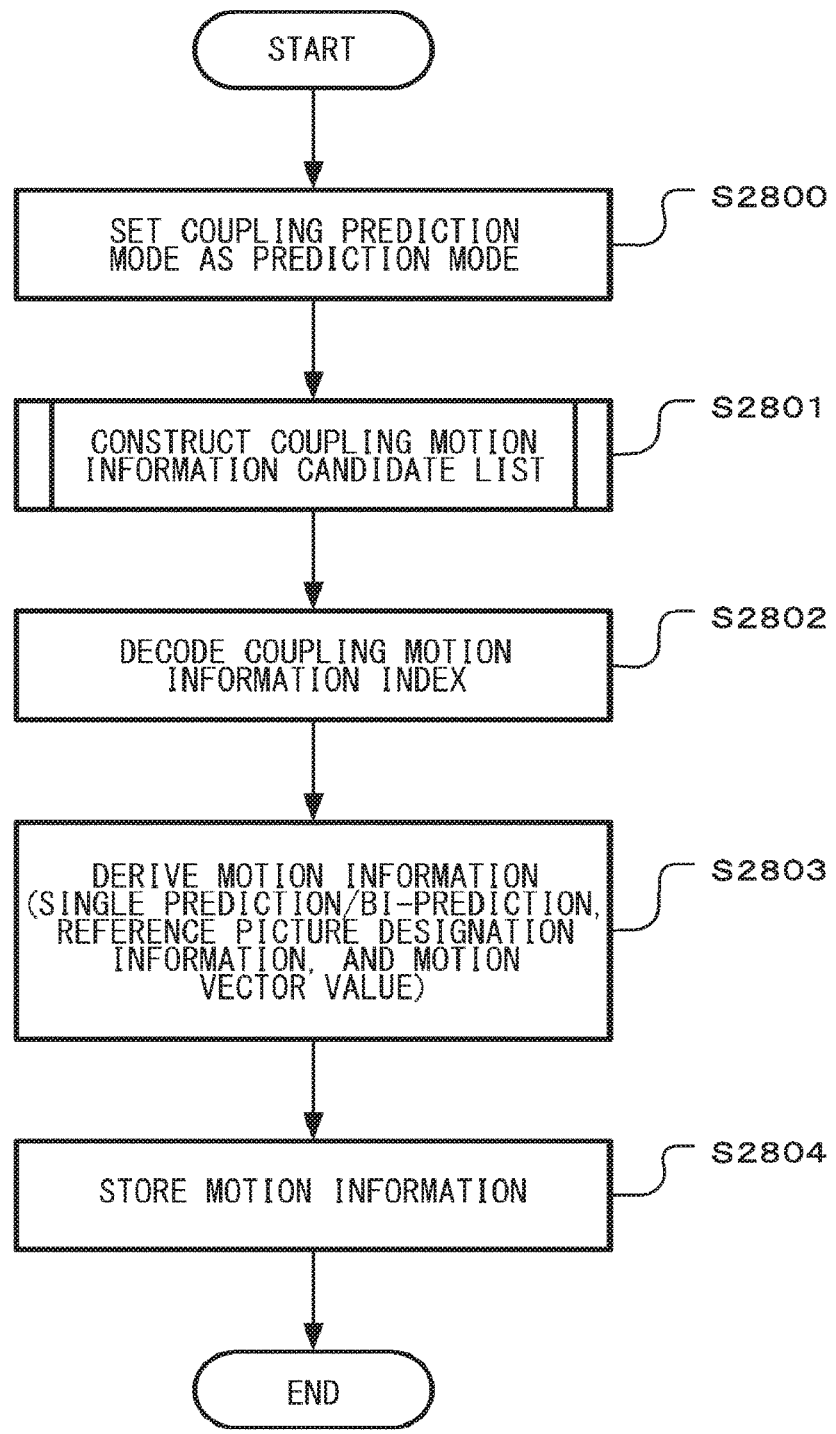
FIG. 29 is a flowchart for describing a detailed operation of a coupling prediction motion information decoding process of FIG. 28.

FIG. 29 is a flowchart for describing a detailed operation of the coupling prediction motion information decoding process of step S2702 of FIG. 28.

First, the coupling prediction mode is set as the prediction mode (S2800), and the coupling motion information candidate list is constructed (S2801). The process of step S2801 is the same process as the coupling motion information candidate list construction process of step S1100 of FIG. 11 in the moving picture coding device.

Then, the coupling motion information index is decoded (S2802), and the motion information stored at the position indicated by the coupling motion information index is derived from the coupling motion information candidate list (S2803). The motion information to be derived includes the prediction type indicating the single prediction/the bi-prediction, the reference picture designation information, and the motion vector value.

The constructed motion information is stored as the motion information of the coupling prediction mode (S2804), and supplied to the coupling motion compensation prediction decoder 2605.

Figure 30:
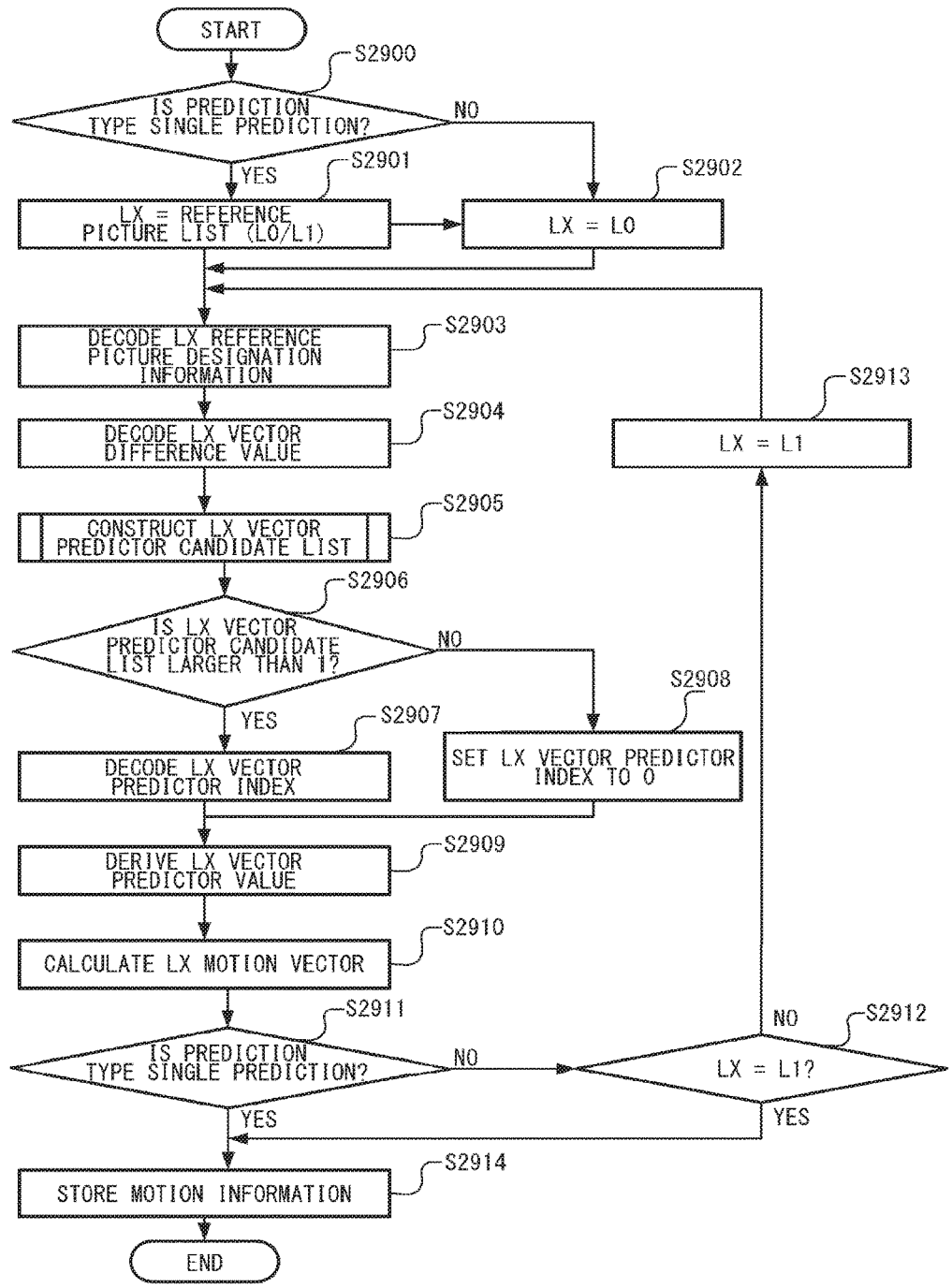
FIG. 30 is a flowchart for describing a detailed operation of a prediction motion information decoding process of FIG. 28.

FIG. 30 is a flowchart for describing a detailed operation of the prediction motion information decoding process of step S2706 of FIG. 28.

First, it is determined whether or not the prediction type is the single prediction (S2900). When the prediction type is the single prediction, the reference picture list used for prediction is set as the reference picture list (LX) of the processing target (S2901). However, when the prediction type is not the single prediction, the prediction type is the bi-prediction, and thus in this case, L0 is set as LX (S2902).

Then, the reference picture designation information is decoded (S2903), and the vector difference value is decoded (S2904). Then, the vector predictor candidate list is constructed (S2905). When the vector predictor candidate list is larger than 1 (YES in S2906), the vector predictor index is decoded (S2907), and when the vector predictor candidate list is 1 (NO in S2906), 0 is set to the vector predictor index (S2908).

Here, the process of step S2905 is performed, similarly to the process as step S2504 in the flowchart of FIG. 26 in the moving picture coding device.

Then, the motion vector value stored at the position indicated by the vector predictor index is derived from the vector predictor candidate list (S2909). The decoded vector difference value is added to the motion vector value to reproduce the motion vector (S2910).

Then, it is determined whether or not the prediction type is the single prediction again (S2911), and when the prediction type is the single prediction, the process proceeds to step S2914. However, when the prediction type is not the single prediction, that is, when the prediction type is the bi-prediction, it is determined whether or not the reference list LX of the processing target is L1 (S2912). When the reference list LX is L1, the process proceeds to step S2914, but when the reference list LX is not L1, that is, the reference list LX is L0, L1 is set as LX (S2913), and the same process as the process of steps S2903 to S2911 is performed.

Then, as the constructed motion information, the prediction type and the reference picture designation information and the motion vector value for one reference picture in the case of the single prediction or the reference picture designation information and the motion vector value for two reference pictures in the case of the bi-prediction are stored (S2914), and supplied to the motion compensation prediction decoder 2603.

Figure 31:
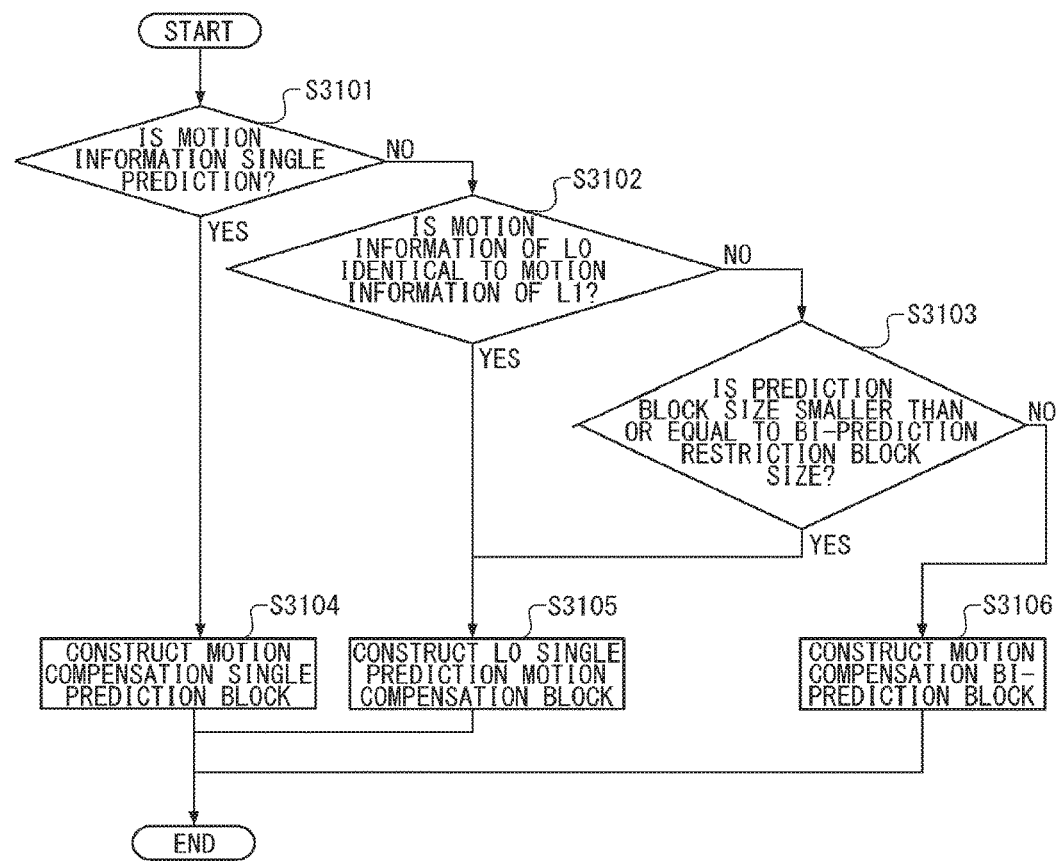
FIG. 31 is a flowchart for describing a detailed operation of a motion compensation predictor of FIG. 6.

FIG. 31 is a flowchart for describing a detailed operation of the motion compensation predictor 608 in the moving picture decoding device of FIG. 6 according to the embodiment. The motion compensation predictor 608 has the same function as the motion compensation predictor 108 in the moving picture coding device of FIG. 1, and performs the following operation.

When the prediction type of the supplied motion information is the single prediction (YES in S3101), a motion compensation single prediction block is constructed using the reference picture designation information and the motion vector for one reference picture (S3104).

When the supplied motion information is not the single prediction, that is, when the motion information is the bi-prediction (NO in S3101), it is determined whether or not the motion information of L0 prediction is identical to the motion information (the reference picture information and the motion vector) of L1 prediction. When the motion information of L0 prediction is identical to the motion information of L1 prediction (YES in S3102), L0 single prediction motion compensation prediction is performed using only the motion information of L0 prediction (S3105). Here, the motion information of the bi-prediction is maintained, and the motion information of L1 prediction does not change.

When the supplied motion information of L0 prediction is not identical to the motion information of L1 prediction (NO in S3102), it is determined whether or not the prediction block size is smaller than or equal to the bi-prediction restriction size. When the prediction block size is smaller than or equal to the bi-prediction restriction block size (YES in S3103), L0 single prediction motion compensation prediction is performed using only the motion information of L0 prediction (S3105), similarly to when the motion information of L0 prediction is identical to the motion information of L1 prediction (YES in S3102). Here, the motion information of the bi-prediction is maintained, and the motion information of L1 prediction does not change. The bi-prediction restriction aims to restrict the bi-prediction to the single prediction and suppress the motion compensation prediction memory band, and thus the prediction list (L0/L1) restricted by the bi-prediction restriction may be set to L1 single prediction.

Here, the bi-prediction restriction block size is set to a block size less than 8.times.8, similarly to the bi-prediction restriction at the coding side. Here, the threshold value is not limited to 8.times.8, and as long as the threshold value is between the largest prediction block size and the smallest prediction block size, the bi-prediction restriction block size may be set to another value and may be set to a block smaller than or equal to 8.times.8, including an 8.times.8 block. The bi-prediction restriction block size may be set according to syntax transmitted from the coding side. Further, in order to reduce a coding amount of syntax related to the bi-prediction restriction, the coding side may transmit a flag indicating whether or not the bi-prediction restriction is performed in a certain block size (for example, 8.times.8), and the decoding side may determine whether or not the bi-prediction restriction is performed in a certain block size.

When the supplied prediction block size is neither smaller than nor equal to the bi-prediction restriction block size (NO in S3103), a motion compensation bi-prediction block is constructed using the reference picture designation information and the motion vector for two reference pictures (S3106).

In the moving picture coding device and the moving picture decoding device according to the embodiment, in order to suppress the motion compensation prediction memory band, the prediction type of the prediction block having the size smaller than or equal to a certain prediction block size is restricted. Specifically, in the motion detection prediction mode, even when the prediction block size is smaller than or equal to a certain prediction block size, it is allowed to transmit the prediction type of the prediction block, and in the coupling prediction mode, even when the prediction type of the prediction block having the size smaller than or equal to a certain prediction block size is the bi-prediction, the motion compensation prediction is performed as the single prediction in the L0 direction. In other words, in the motion information decision processes, conditional branching related to the bi-prediction restriction is not performed. In the motion detection prediction mode and the respective processes during the coupling motion prediction candidate construction, a condition determination as to whether or not it is smaller than or equal to a certain prediction block size is not added, and the motion compensation prediction is collectively performed in the single prediction in an L0 direction when the prediction type of the prediction block smaller than or equal to the certain prediction block size is the bi-prediction at the time of the motion compensation prediction after the motion information decision, and thus it is possible to suppress the motion compensation prediction memory band by minimum conditional branching addition.

Further, the coupling motion information candidate in which the prediction signal is for the single prediction, and the motion information is for the bi-prediction can be maintained. Thus, as illustrated in FIG. 33, even when the prediction block has the size smaller than or equal to a certain prediction block size, the motion information is stored based on L0 prediction or L1 prediction, and thus information of the bi-prediction can be used as neighboring reference motion information of a prediction block to be subsequently coded or decoded without change, and prediction efficiency of the motion prediction process of a prediction block to be subsequently coded or decoded can be improved.

Further, the present embodiment has been described in connection with the example in which motion compensation prediction memory band is suppressed by changing the bi-prediction to the single prediction when the prediction type is the bi-prediction at the time of the motion compensation prediction, but the motion information to be changed can adapt to changing of the reference picture designation information or the motion vector information as well as the prediction type.

When the reference picture designation information is changed in order to suppress the motion compensation prediction memory band, in order to uniform the reference picture of the prediction block having the size smaller than or equal to a certain block size, even when the reference picture designation information indicated by the motion information is not 0, the reference picture designation information is changed to 0, and the motion compensation prediction is performed. A1 the reference picture designation information of the prediction block having the size smaller than or equal to a certain block size may be designated as 0, and in this case, it is possible to scale the motion vector according to the distance between the changed reference pictures in the size smaller than or equal to the certain block size and improve reliability of the motion vector.

When the motion vector information is changed in order to suppress the motion compensation prediction memory band, the motion vector value of the prediction block having the size smaller than or equal to a certain block size is changed to a value within a certain rage, and the motion compensation prediction is performed. In other words, the motion vector value clipping process is performed, and a situation in which the motion vector has a large value in the prediction block having the size smaller than or equal to a certain block size, and thus the memory band increases is suppressed. For example, when the motion vector is (345, 272), the motion vector is clipped to (256,256). Here, a clipping value is not limited to 256.

Further, compared to when only the coding side prohibits the prediction block having the size smaller than or equal to a certain block size from being selected as the bi-prediction at the time of the motion information selection, it is possible to increase error tolerance of a bitstream by performing the bi-prediction restriction at the time of the motion compensation prediction according to the present embodiment. In other words, in the configuration having no function of performing the bi-prediction restriction on the prediction block having the size smaller than or equal to a certain block size at the time of the motion compensation prediction, it is necessary to restrict a bitstream according to the bi-prediction restriction, but when the bi-prediction is restricted at the time of the motion compensation prediction, it is unnecessary to restrict the bitstream according to the bi-prediction restriction, and it is unnecessary for the decoding side to individually support an operation corresponding to a bitstream which is not specified. Particularly, in the coupling prediction mode, since a syntax element to be restricted adaptively changes according to whether or not each coupling prediction mode candidate is the bi-prediction, when the prediction type is restricted by the single prediction at only the coding side, it is complicated for the decoding side to determine an error of a bitstream. Meanwhile, in the coupling prediction mode of the present invention, it is unnecessary to consider an error determination of each syntax element of Skip flag, the merge flag, and the coupling motion information index in which whether or not a value is restricted changes according to whether or not the prediction type of the coupling prediction mode candidate is the bi-prediction. The present embodiment relates to a configuration with a bi-prediction restriction function that is smallest in a load of a processing amount and has error tolerance.

A bitstream of a moving picture output from the moving picture coding device according to the embodiment has a specific data format that can be decoded according to a coding technique used in the embodiment, and the moving picture decoding device corresponding to the moving picture coding device can decode the bitstream of the specific data format.

In order to exchange a bitstream between the moving picture coding device and the moving picture decoding device, when a wired or wireless network is used, a bitstream may be converted into a data format suitable for a transmission form of a transmission path and then transmitted. In this case, a moving picture transmitting device that converts the bitstream output from the moving picture coding device into coding data of the data format suitable for the transmission form of the communication path and then transmits the coding data to the network and a moving picture receiving device that receives the coding data from the network, reconstructs the bitstream, and supplies the bitstream to the moving picture decoding device are provided.

The moving picture transmitting device includes a memory that buffers the bitstream output from the moving picture coding device, a packet processor that packetizes the bitstream, and a transmitter that transmits the packetized coding data via the network. The moving picture receiving device includes a receiver that receives the packetized coding data via the network, a memory that buffers the received coding data, and a packet processor that performs packet processing on the coding data, constructs the bitstream, and supplies the bitstream to the moving picture decoding device.

Further, the process related to the coding and the decoding can be implemented as a transmitting, accumulating, or receiving device using hardware and can be implemented by firmware stored in read only memory (ROM), flash memory, or the like or computer software or the like. The firmware program and the software program can be recorded in a computer readable recording medium and provided, can be provided from a server via a wired or wireless network, or can be provided as data broadcasting of a terrestrial or satellite digital broadcasting.

The exemplary embodiments of the present invention have been described so far. The embodiment is an example, and it should be understood by those skilled in the art that the combination of the respective components or the respective processing processes can be variously modified, and various modifications are also within the scope of the present invention.

What is claimed is:

1. A moving picture coding device that codes a moving picture using motion compensation prediction in units of blocks acquired by dividing each picture of the moving picture, comprising:
   a motion information deriver that derives motion information from any of blocks spatially and blocks temporally neighboring a coding target block and stores the derived motion information without converting from bi-prediction into single prediction even if a prediction block size is smaller than a certain size; and
   a motion compensation predictor that performs motion compensation prediction using the derived motion information if the prediction block size is larger than or equal to the certain size, and performs motion compensation prediction assuming the motion information as single prediction instead of using the derived motion information if the prediction block size is smaller than the certain size even when the derived motion information is bi-prediction.

2. A moving picture coding method of coding a moving picture using motion compensation prediction in units of blocks acquired by dividing each picture of the moving picture, comprising:
   a motion information deriving step of deriving motion information from any of blocks spatially and blocks temporally neighboring a coding target block and storing the derived motion information without converting from bi-prediction into single prediction even if a prediction block size is smaller than a certain size; and
   a motion compensation predicting step of performing motion compensation prediction using the derived motion information if the prediction block size is larger than or equal to the certain size, and performing motion compensation prediction assuming the motion information as single prediction instead of using the derived motion information if the prediction block size is smaller than the certain size even when the derived motion information is bi-prediction.

* * * * *